(12) United States Patent
Yasuie et al.

(10) Patent No.: US 8,059,529 B2
(45) Date of Patent: Nov. 15, 2011

(54) METHOD AND APPARATUS FOR CONTROLLING NETWORK TRAFFIC, AND COMPUTER PRODUCT

(75) Inventors: Takeshi Yasuie, Kawasaki (JP); Yuji Nomura, Kawasaki (JP); Kenichi Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 688 days.

(21) Appl. No.: 11/140,331

(22) Filed: May 27, 2005

(65) Prior Publication Data
US 2005/0220016 A1 Oct. 6, 2005

Related U.S. Application Data

(63) Continuation of application No. PCT/JP03/06770, filed on May 29, 2003.

(51) Int. Cl.
*H04L 12/16* (2006.01)
(52) U.S. Cl. ...................................................... 370/229
(58) Field of Classification Search .................. 370/241, 370/229–238
See application file for complete search history.

(56) References Cited

U.S. PATENT DOCUMENTS

| | | | | |
|---|---|---|---|---|
| 6,600,735 | B1 * | 7/2003 | Iwama et al. ................. | 370/352 |
| 6,674,726 | B1 * | 1/2004 | Kado et al. .................... | 370/253 |
| 6,912,574 | B2 * | 6/2005 | Scifres et al. ................. | 709/224 |
| 6,912,575 | B1 * | 6/2005 | Swift et al. .................... | 709/226 |
| 7,099,674 | B2 * | 8/2006 | Diao et al. .................... | 455/453 |
| 7,333,431 | B2 * | 2/2008 | Wen et al. .................. | 370/230.1 |
| 2001/0043617 | A1 * | 11/2001 | McKinnon et al. ........... | 370/477 |
| 2002/0141342 | A1 * | 10/2002 | Furman et al. ................ | 370/235 |
| 2002/0141351 | A1 * | 10/2002 | Maltz et al. ................... | 370/254 |
| 2006/0159020 | A1 * | 7/2006 | Porat ............................. | 370/235 |
| 2006/0250959 | A1 * | 11/2006 | Porat ............................. | 370/230 |
| 2009/0313634 | A1 * | 12/2009 | Nguyen et al. ................ | 718/105 |

FOREIGN PATENT DOCUMENTS

| | | |
|---|---|---|
| JP | 7-235985 | 9/1995 |
| JP | 11-096135 | 4/1999 |
| JP | 2000-194615 | 7/2000 |
| JP | 2001-028628 | 1/2001 |

OTHER PUBLICATIONS

Nancy K. Groschwitz et al. A Time Series Model of Long-Term NSFNET Backbone Traffic. Proceedings IEEE International Conference on Communications, 1994.
Yoshiyasu Takahashi, et al. ARIMA Model's Superiority over f-ARIMA Model. International Conference on Communication Technology 2000.
International Search Report dated Sep. 2, 2003.

* cited by examiner

*Primary Examiner* — Kwang B Yao
*Assistant Examiner* — Juvena Loo
(74) *Attorney, Agent, or Firm* — Fujitsu Patent Center

(57) ABSTRACT

For controlling a traffic on a network including a plurality of links, the apparatus includes a collecting unit that collects information on the traffic for each of the links periodically; an acquiring unit that acquires basic data collected from a link for a predetermined period; and a predicting unit that predicts a future traffic on the link based on the basic data. The start time of the predetermined period is the time when the latest control of the traffic was performed on the link or other link adjacent to the link.

17 Claims, 23 Drawing Sheets

| LINK | ADJACENT LINKS |
|---|---|
| LINK L1 | LINK L2, LINK L3, LINK L5 |
| LINK L2 | LINK L1, LINK L4 LINK L6 |
| LINK L3 | LINK L1, LINK L4, LINK L5 |
| ⋮ | ⋮ |

| PATH | LINKS |
|---|---|
| PATH P1 | LINK L1, LINK L2, LINK L5, LINK L6 |
| PATH P2 | LINK L3, LINK L4, LINK L5, LINK L6 |
| ⋮ | ⋮ |

| MEASUREMENT DATE AND TIME | TRAFFIC (Mbps) |
|---|---|
| ⋮ | ⋮ |
| 2002.12.01 09 :00 | 20 |
| 2002.12.01 09 :05 | 25 |
| 2002.12.01 09 :10 | 27 |
| 2002.12.01 09 :15 | 32 |
| 2002.12.01 09 :20 | 32 |
| 2002.12.01 09 :25 | 35 |
| 2002.12.01 09 :30 | 33 |
| 2002.12.01 09 :35 | 38 |
| 2002.12.01 09 :40 | 40 |
| ⋮ | ⋮ |

| CONTROL TIME | TYPE OF CONTROL | AFFECTED LINKS |
|---|---|---|
| 2002/12/02 14:20:00 | DISCARD CONTROL OF LOW PREFERENCE TRAFFIC | LINK L1 |
| 2002/12/02 15:40:00 | PATH ROUTE SWITCHING CONTROL | LINK L1, LINK L2, LINK L3, LINK L4 |
| ⋮ | ⋮ | ⋮ |

140

METHOD AND APPARATUS FOR CONTROLLING NETWORK TRAFFIC, AND COMPUTER PRODUCT

CROSS REFERENCE TO RELATED APPLICATION

This application is a continuation of International Application PCT/JP2003/006770, filed on May 29, 2003, pending at the time of filing of this continuation application, the contents of which are herein wholly incorporated by reference.

BACKGROUND OF THE INVENTION

1) Field of the Invention

The present invention relates to a technology for controlling a network traffic by improving an accuracy in predicting the network traffic and by optimizing a timing of a traffic control.

2) Description of the Related Art

In a conventional communication network, a prediction technology for future traffic based on past traffic (actual measurement value), such as a method of a linear-time-series analysis based on an autoregressive integrated moving average (ARIMA) model, has been suggested.

The linear-time-series analysis is used for analyzing a value (data) measured over time to perform a prediction or a verification of an assumption.

In the linear-time-series analysis, a measurement value at a certain point in time is represented by a linear polynomial of past measurement value and past noise components. Therefore, a value predicted by the linear-time-series analysis largely depends on the past measurement value.

In the ARIMA model, a time series $z_t$ is represented by a linear polynomial of autoregressive components $z_{t-1}$, $z_{t-2}$, ..., and $z_{t-p}$, and moving average components $a_t$, $a_{t-1}$, ..., and $a_{t-g}$ of white noise. The model is generally expressed as $$\phi(B)\Phi(B^S)\Delta_S^D\Delta^d z_t = \theta(B)\Theta(B^s)a_t$$

where
$z_t$: Deviation from the time series average,
$a_t$: White noise (error),
B: Lug operator ($Bz_t = z_{t-1}$),
$\Delta$: Difference operator ($\Delta z_t = z_t - z_{t-1}$),
$\Delta_S$: Seasonal difference operator ($\Delta_S z_t = z_t - z_{t-s}$),
$\phi(B) = 1 - \phi_1 B - \phi_2 B^2 - \ldots - \phi_p B^p$ (Autoregressive components),
$\Phi(B^S) = 1 - \Phi_1 B^s - \Phi_2 B^{2s} - \ldots - \Phi_P B^{Ps}$ (Periodic autoregressive components),
$\theta(B) = 1 - \theta_1 B - \theta_2 B^2 - \ldots - \theta_q B^q$ (Moving average components of white noise), and
$\Theta(B^s) = 1 - \Theta_1 B^s - \Theta_2 B^{2s} - \ldots - \Theta_Q B^{Qs}$ (Periodic moving average components of white noise).

FIG. 25 is a diagram for explaining conventional traffic prediction using the ARIMA model. In FIG. 25, at step SZ1, information on traffic measured in the target network (that is, data amount passing through the network) is input.

At step SZ2, ARIMA model identification processing is executed. That is, after an autocorrelation function (ACF) and a partial autocorrelation function (PACF) in the input information are calculated, the ARIMA model (p, d, q, P, D, Q, s) is identified by the shapes thereof.

At step SZ3, parameter presumption processing is executed. That is, the parameters of the ARIMA model ($\phi_1 \ldots \phi_p, \theta_1 \ldots \theta_q, \Phi_1 \ldots \Phi_p, \Theta_1 \ldots \Theta_Q$) are presumed by the method of maximum likelihood or the method of least squares.

At step SZ4, the accuracy of the ARIMA model identified at step SZ2 and the parameters presumed at step SZ3 are determined. At step SZ5, future date and time are applied to the ARIMA model to predict the future traffic.

By the way, in the conventional network, traffic control for decreasing the traffic is performed before the traffic reaches the maximum capacity.

A preparation time is required since the traffic control is started until the effect of the control is seen. Conventionally, therefore, a threshold is set to a predetermined percentage (for example, 80%) of the maximum capacity to start the traffic control when the traffic reaches the threshold.

Conventionally, as shown in FIG. 26, when the traffic control such as a discard control (control of discarding a low-preference traffic) and a path route switching control is executed, the traffic in the affected link largely fluctuates before and after the traffic control (in the example shown in FIG. 26, the traffic decreases suddenly, as shown by solid line, due to the execution of the traffic control).

Therefore, when the traffic is predicted by the conventional ARIMA model, a sudden change appears in the predicted traffic in the prediction period (as shown in FIG. 26 by a broken-line) since the traffic in the data collection period for prediction is fluctuated due to the traffic control.

Thus, the traffic control adversely affects the predicted traffic, thereby decreasing the accuracy in predicting the traffic.

On the other hand, in the conventional traffic control in which a threshold to a certain percentage of the maximum capacity is set, it is difficult to ascertain to which percentage the threshold is to be set. Further, in the conventional traffic control in which the traffic control is executed when the traffic exceeds the threshold, control may be too early, too late to cause an excess of the maximum capacity, or unnecessary control may be executed.

SUMMARY OF THE INVENTION

It is an object of the present invention to at least solve the problems in the conventional technology.

An apparatus according to an aspect of the present invention, which controls a traffic on a network including a plurality of links, includes a collecting unit that collects information on the traffic for each of the links periodically; an acquiring unit that acquires basic data collected from a link for a predetermined period; and a predicting unit that predicts a future traffic on the link based on the basic data. The start time of the predetermined period is the time when the latest control of the traffic was performed on the link or other link adjacent to the link.

A method according to another aspect of the present invention, which is for controlling a traffic on a network including a plurality of links, includes collecting information on the traffic for each of the links periodically; acquiring basic data collected from a link for a predetermined period; and predicting a future traffic on the link based on the basic data. The start time of the predetermined period is the time when the latest control of the traffic was performed on the link or other link adjacent to the link.

A computer-readable recording medium according to still another aspect of the present invention stores a computer program for controlling a traffic on a network including a plurality of links. The computer program causes a computer to execute the above method according to the present invention.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 6 is a schematic diagram of a network configuration database shown in FIG. 1;

FIG. 7 is a schematic diagram of a path/link database shown in FIG. 1;

FIG. 8 is a schematic diagram of a traffic database shown in FIG. 1;

DETAILED DESCRIPTION

Exemplary embodiments of the present invention will be explained in detail below with reference to the accompanying drawings.

Figure 1:
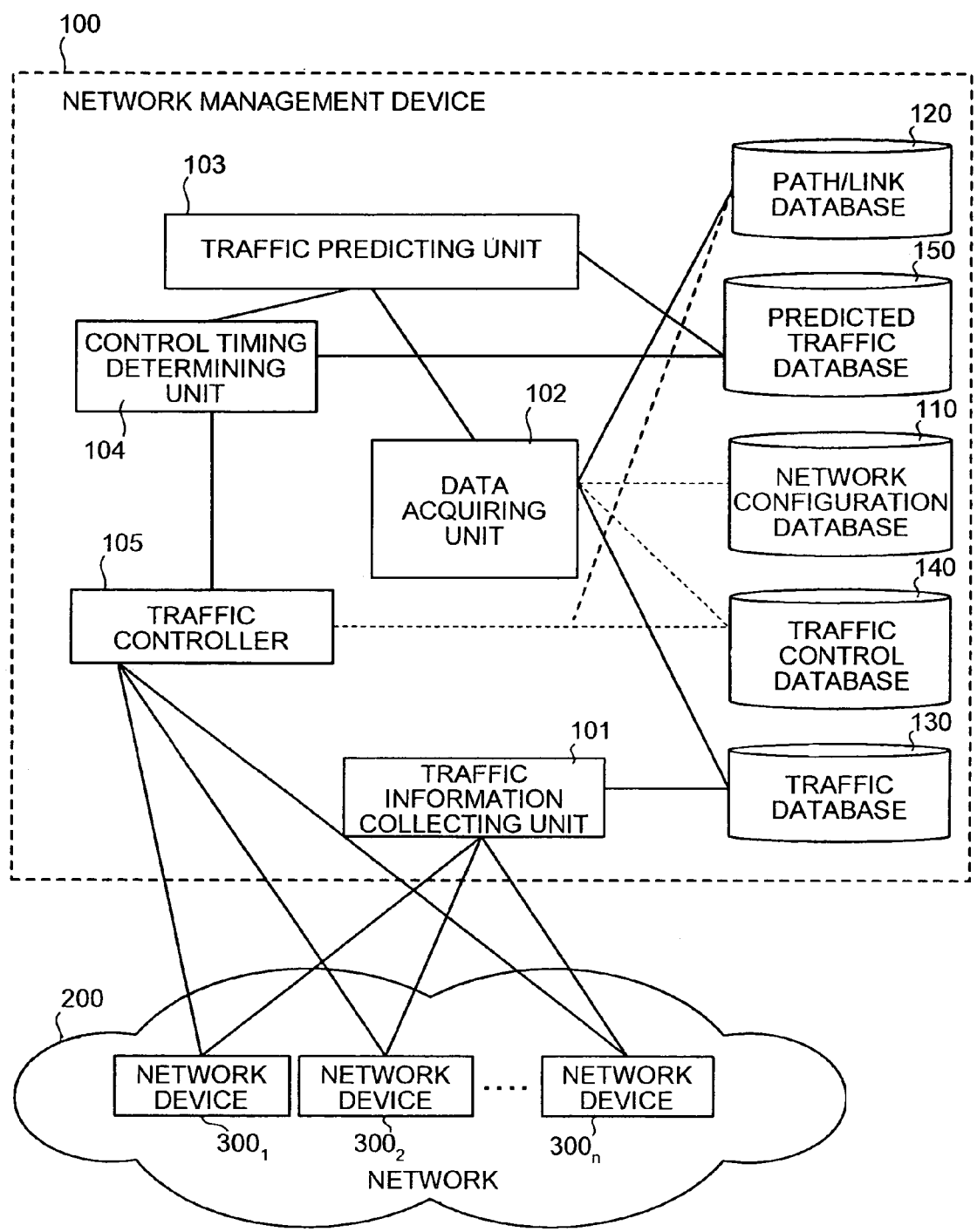
FIG. 1 is a block diagram of a network management device according to an embodiment of the present invention.

FIG. 1 is a block diagram of a network management device 100 according to an embodiment of the present invention and a network 200 (such as the Internet) including network devices $300_1$ to $300_n$.

The network management device 100 performs network management of the network 200. Specifically, the network management device 100 collects traffic information (actual measurement value) from the network 200, predicts future traffic based on the collected traffic information, and controls the traffic.

Figure 2:
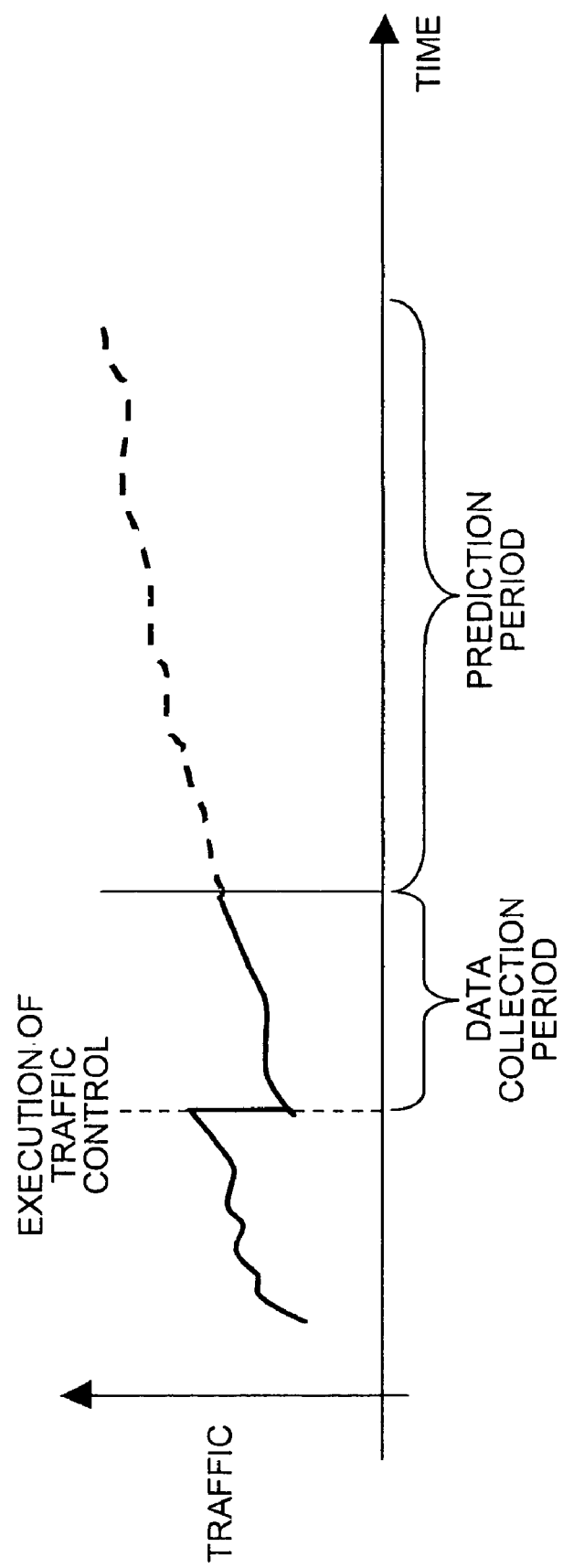
FIG. 2 is a diagram for explaining the principle of the embodiment.

The principle of the embodiment will be explained with reference to FIG. 2. In the embodiment, as shown in FIG. 2, the traffic in the prediction period is predicted by the traffic in the data collection period, which does not include a period in which the traffic is fluctuated due to the execution of the traffic control.

In the embodiment, therefore, the predicted traffic in the prediction period changes continuously and is accurate since it is not affected by a fluctuation due to the traffic control.

Figure 3:
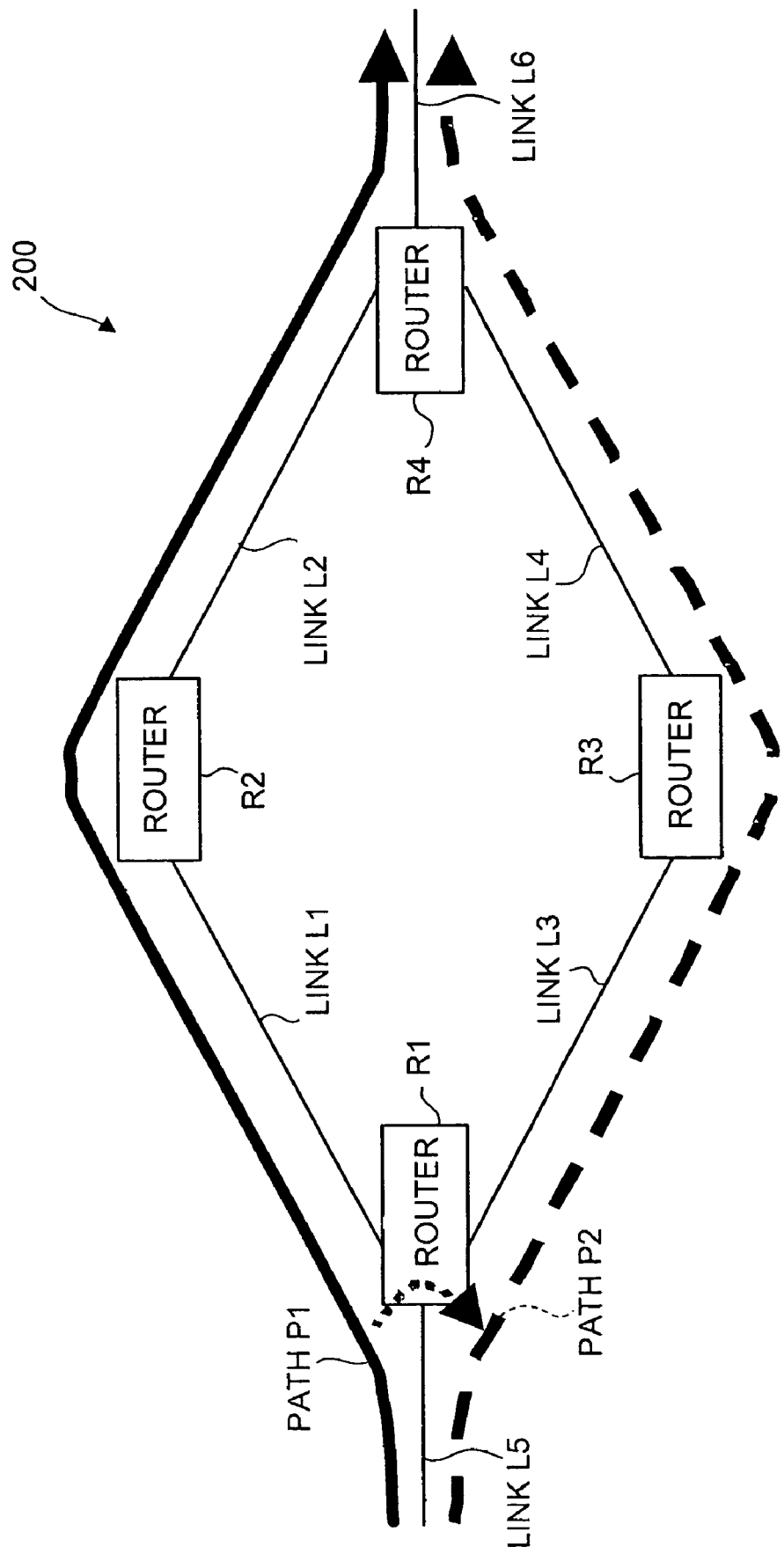
FIG. 3 is a diagram of a configuration of a network shown in FIG. 1.

FIG. 3 is a diagram of a configuration of the network 200 shown in FIG. 1. The network 200 includes routers R1 to R4 each corresponding to the network devices $300_1$ to $300_n$, respectively. The routers R1 to R4 form links L1 to L6. A path P1 is, for example, an active path and is formed of the link L5, the router R1, the link L1, the router R2, the link L2, the router R4, and the link L6.

On the other hand, a path P2 is, for example, a spare path of the path P1, and is formed of the link L5, the router R1, the link L3, the router R3, the link L4, the router R4, and the link L6.

Figure 4:
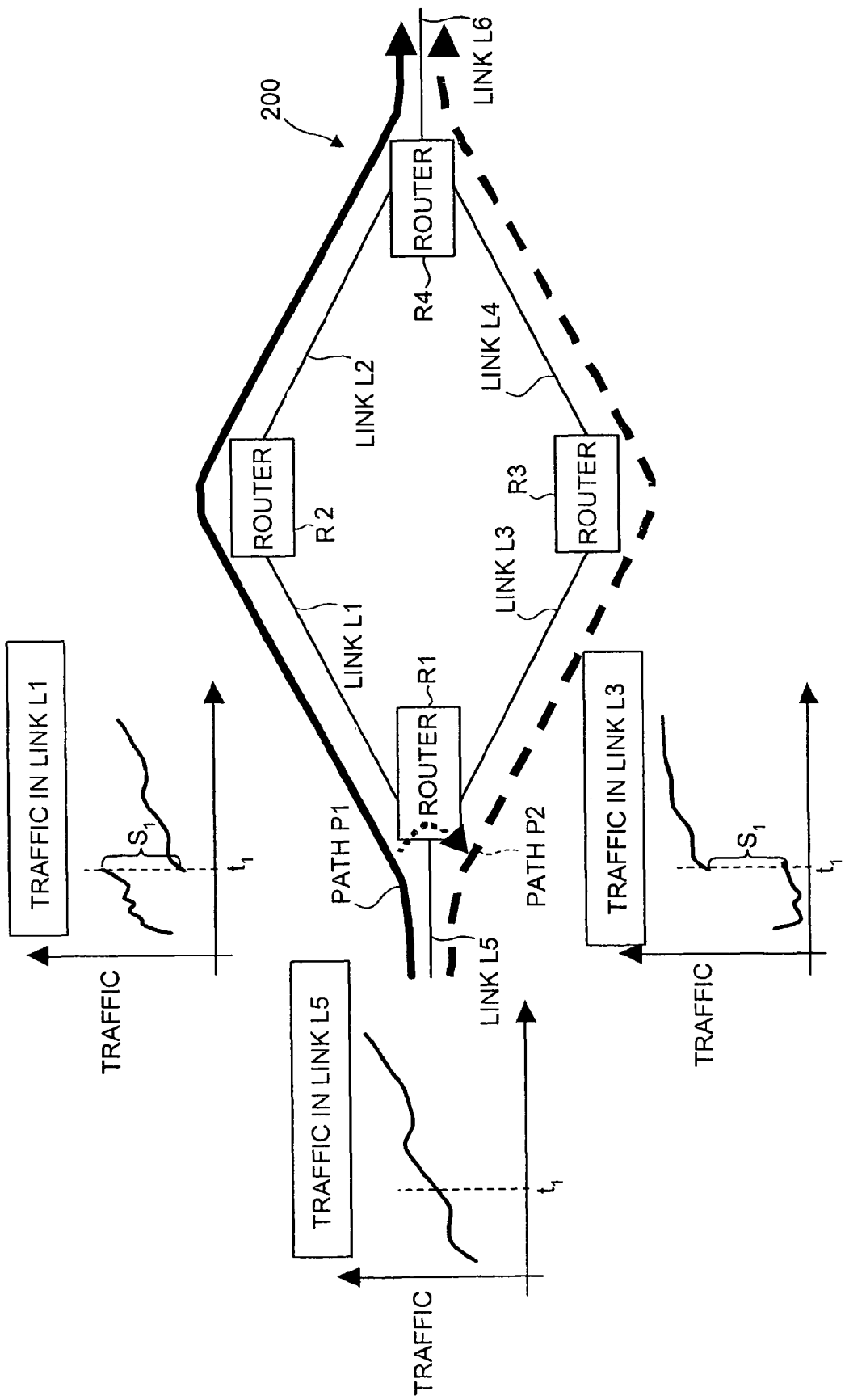
FIG. 4 is a diagram for explaining fluctuations in traffic due to traffic control in the network.

As shown in FIG. 4, for example, switching from the path P1 to the path P2 is performed at a control timing (see FIG. 5) determined by a control timing determining unit 104, explained later.

In FIG. 4, changes in the traffic over time in the links L1, L3, and L5 are also shown in graphs.

The routers R1 to R4 shown in FIGS. 3 and 4 regularly measure the traffic in the links connected thereto (links L1 to L6) to create traffic information in which the measured traffic and the measured date and time thereof are correlated.

Referring back to FIG. 1, the network management device 100 includes a network configuration database 110, a path/link database 120, a traffic database 130, a traffic control database 140, and a predicted traffic database 150.

The network configuration database 110, the path/link database 120, the traffic database 130, and the traffic control database 140 will be explained below with reference to FIGS. 6 to 10.

The network configuration database 110 shown in FIG. 6 stores information on the configuration of the network 200 (hereinafter, "network configuration information"), and includes fields of link and adjacent link. The link indicates the respective links (links L1 to L6) constituting the network 200. The adjacent link indicates other links adjacent to each link. For example, the adjacent link corresponding to the link L1 is links L2, L3, and L5 (see FIG. 5).

The path/link database 120 shown in FIG. 7 stores the correspondence between the paths and the links in the network 200 (hereinafter, "path/link information").

The path indicates the respective paths (paths P1 and P2) in the network 200. The link indicates links forming each path. For example, the path P1 is formed of the links L1, L2, L5, and L6.

The traffic database 130 shown in FIG. 8 stores traffic information on the traffic measured by the respective routers R1 to R4 and the measured date and time thereof.

Figures 9, 10:
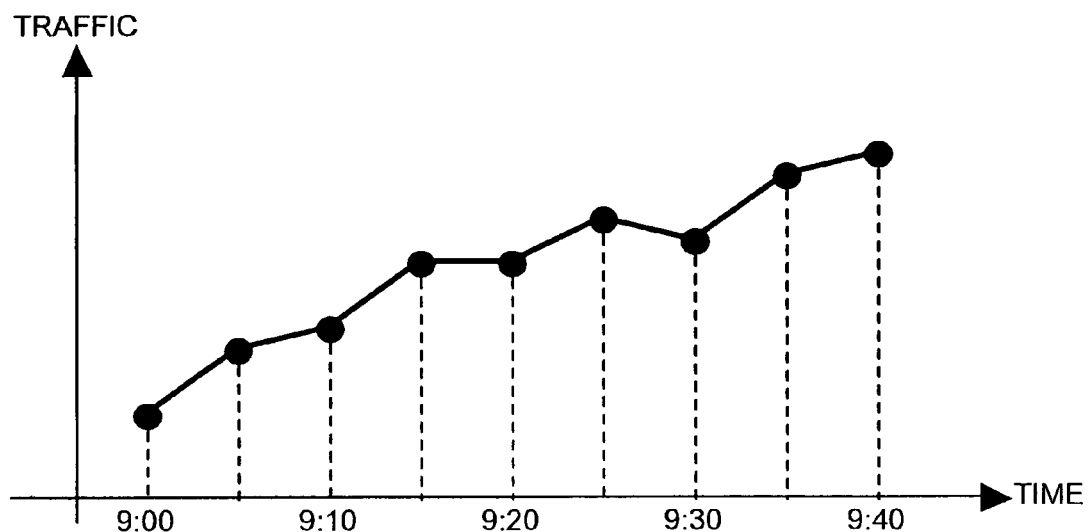
FIG. 9 is a graph of traffic information stored in the traffic database.
FIG. 10 is a schematic diagram of a traffic control database shown in FIG. 1.

FIG. 9 is a graph of the traffic information shown in FIG. 8. As shown in FIG. 9, the traffic changes over time.

The traffic is plotted on the graph in a discrete manner. In FIG. 4 and other figures, the traffic is plotted on the graph as a continuous variate, for the convenience of explanation.

The traffic control database 140 shown in FIG. 10 stores information on the traffic control executed by a traffic controller 105 (hereinafter, "traffic control information") on the network 200, and includes fields of control time, type of control, and affected links.

The control time indicates the date and time when the traffic control has been performed. The type of control indicates the type of the traffic control. The traffic control includes, for example, path route switching control in which the path is switched from the path P1 to the path P2 as shown in FIG. 4, and discard control in which a traffic having low preference in the entire traffic in the link L1 is discarded.

The affected link indicates a link affected by the increase and decrease in the traffic due to the traffic control. For example, when the path route switching control is performed to switch the path from the path P1 to the path P2 shown in FIG. 4, the affected links are links L1 and L2 constituting the path P1 and links L3 and L4 constituting the path P2.

Referring back to FIG. 1, the predicted traffic database 150 stores information on the predicted traffic and time (hereinafter, "predicted traffic information") predicted based on the principle explained with reference to FIG. 2.

A traffic information collecting unit 101 regularly collects the traffic information from the respective routers R1 to R4 (see FIGS. 3 and 4) in the network 200, and storing the traffic information in the traffic database 130 (see FIG. 8).

A data acquiring unit 102 acquires the traffic information in the data collection period, which does not include the period in which the traffic is fluctuated due to the execution of the traffic control, from the traffic database 130 (hereinafter, "basic data"). The basic data is the traffic information used for predicting the traffic.

Figure 25:
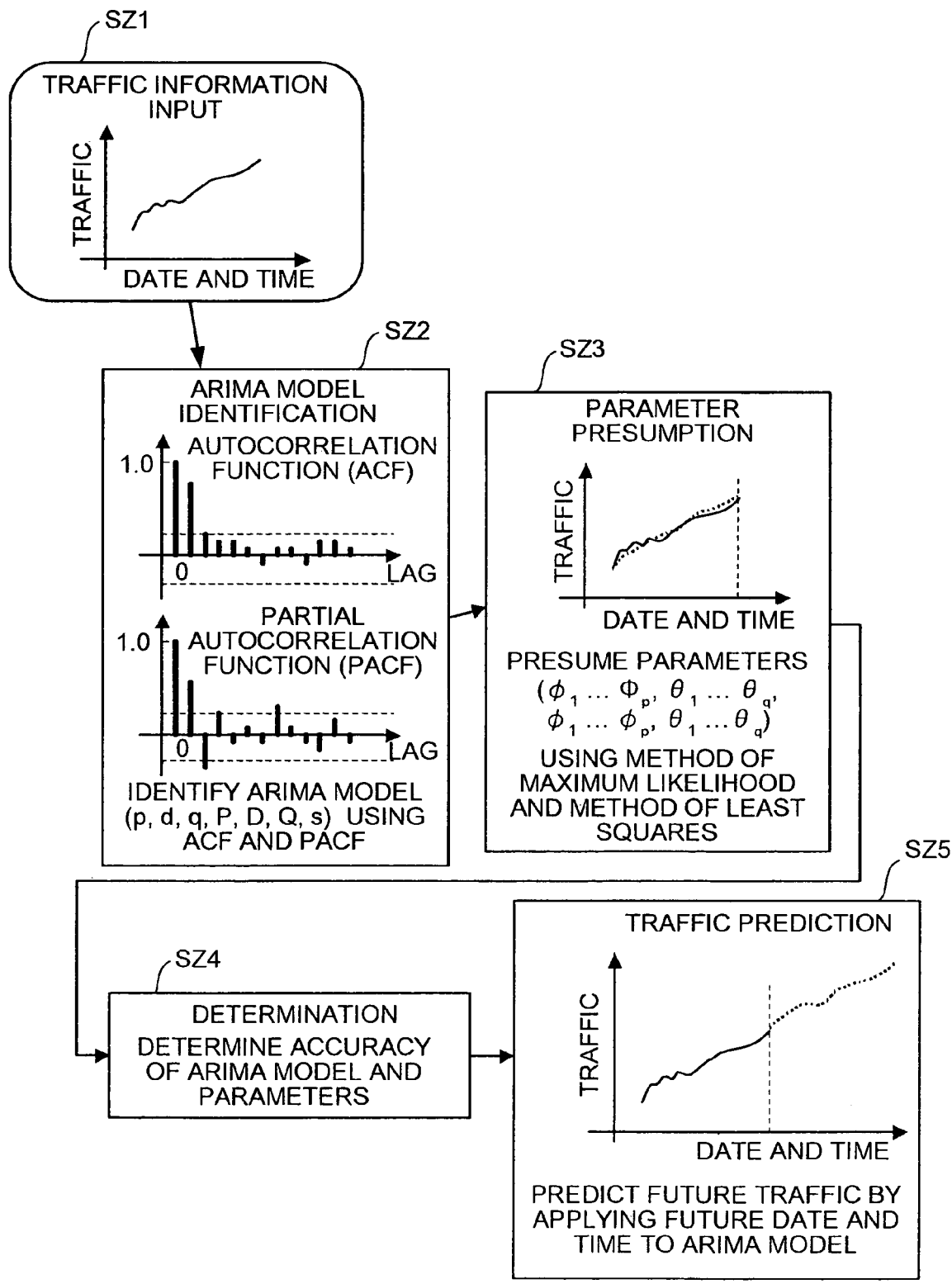
FIG. 25 is a diagram for explaining conventional traffic prediction using an ARIMA model.
Figure 26:
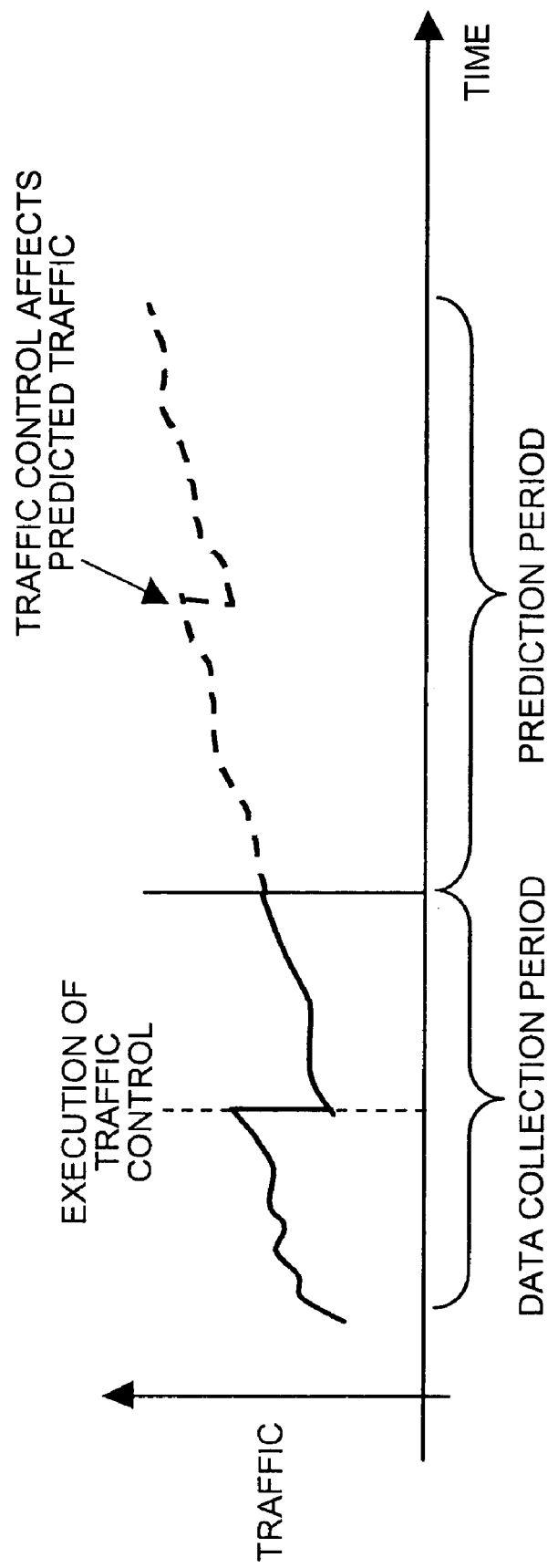
FIG. 26 is a diagram for explaining a problem in the conventional traffic prediction.

A traffic predicting unit 103 predicts the future traffic based on the basic data acquired by the data acquiring unit 102 using the ARIMA model (see FIG. 25). The traffic predicting unit 103 stores the predicted traffic and time in the predicted traffic database 150 as the predicted traffic information.

The control timing determining unit 104 determines the control timing (control time) for executing the traffic control based on the predicted traffic, and informs the traffic controller 105 of the control timing.

The traffic controller 105 executes the traffic control on the network 200 at the control timing, and storing the control time, the type of control, and the affected links in the traffic control database 140 (see FIG. 10) as the traffic control information.

Figure 11:
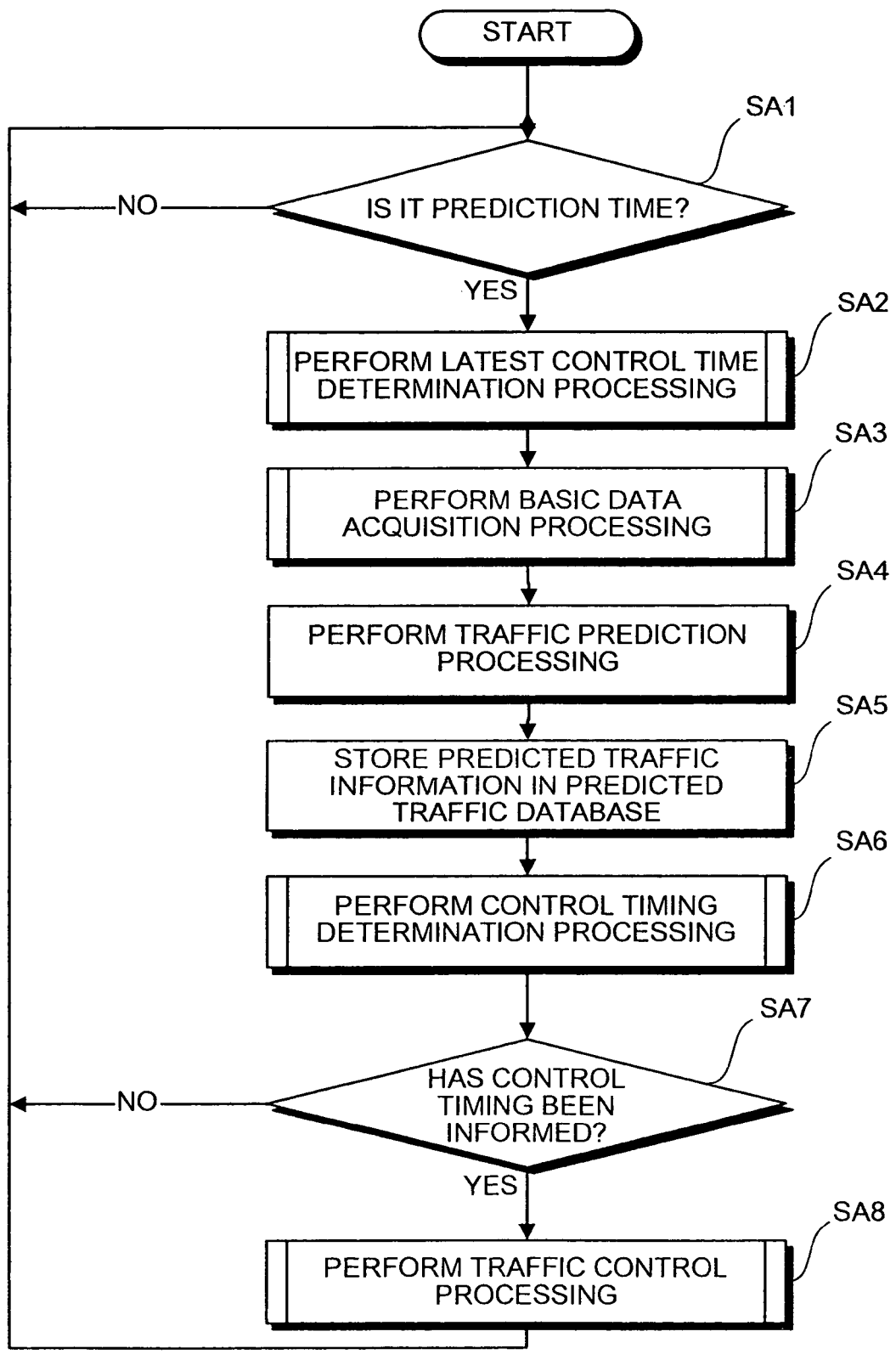
FIG. 11 is a flowchart of overall processing according to the embodiment.

The operation of the network management device 100 according to the embodiment will be explained with reference to the flowcharts shown in FIGS. 11 to 16, and FIGS. 17 and 18. FIG. 11 is a flowchart for explaining the operation. It is assumed that the traffic in the network 200 is predicted for each prediction cycle of 30 minutes.

At step SA1 shown in FIG. 11, the data acquiring unit 102 in the network management device 100 determines whether it is the prediction time (whether 30 minutes has passed since the last traffic prediction). If the determination result is "No", the same determination is repeated.

Figure 17:
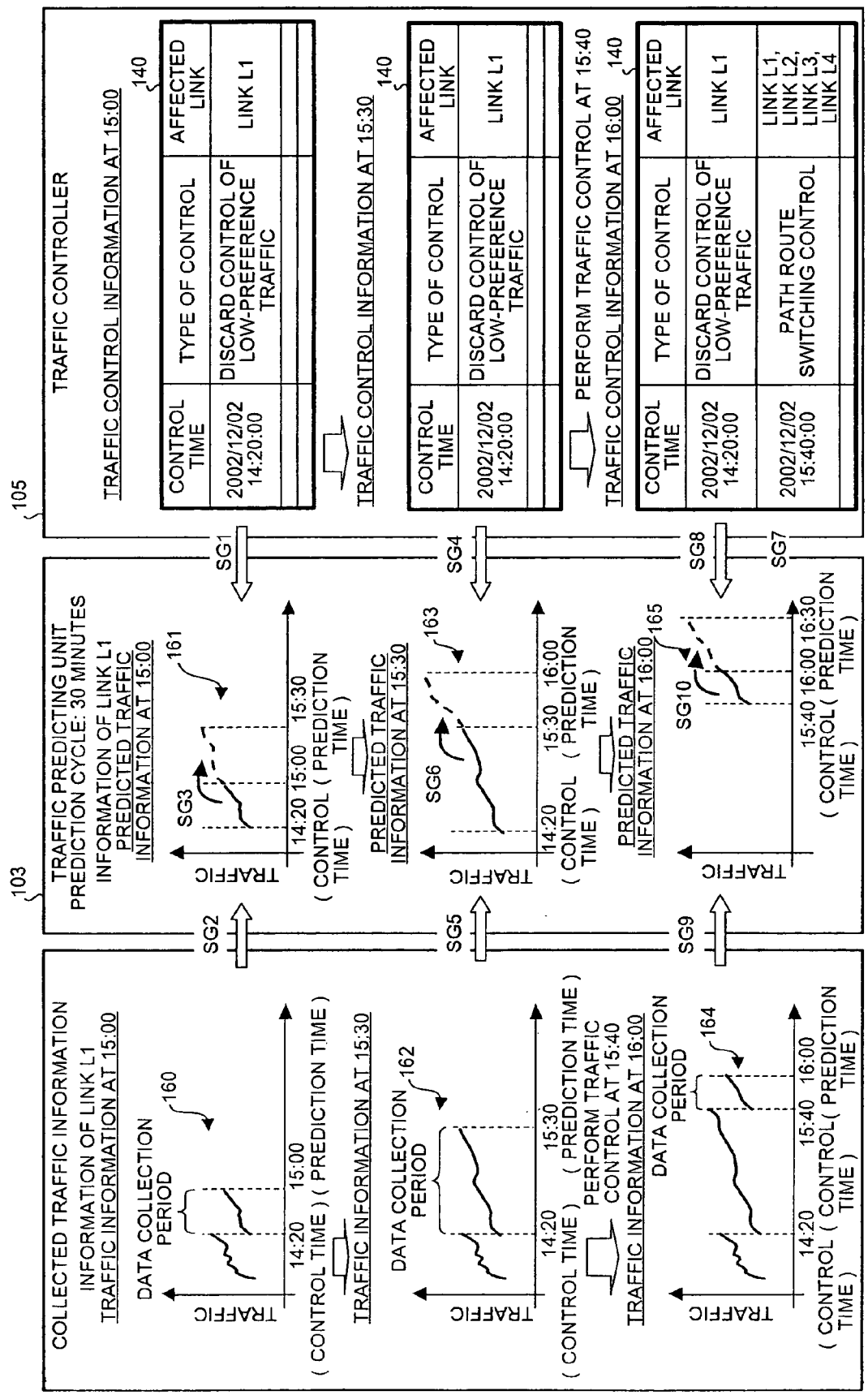
FIG. 17 is a schematic diagram for explaining the overall processing according to the embodiment.

It is assumed that the traffic controller 105 has performed discard control of the low-preference traffic at the control time 2002/12/02 14:20:00 as shown in the traffic controller 105 in FIG. 17. Accordingly, as shown in a graph 160 in FIG. 17, the traffic in the link L1 (the affected link) has decreased suddenly at control time 14:20 (hereinafter, date (2002/12/02) is omitted).

In FIG. 17, respective solid lines in graphs 160 to 165 represent change over time in the traffic in the link L1 (see FIGS. 3 and 4), and correspond to the traffic information (actual measurement value) collected by the traffic information collecting unit 101 (see FIG. 1) and stored in the traffic database 130.

Respective broken lines in graphs 161, 163, and 165 represent change over time in the predicted traffic (predicted value) in the link L1 predicted by the traffic predicting unit 103 (see FIGS. 3 and 4).

At the prediction time 15:00 in the graph 160, the result of the determination at step SA1 shown in FIG. 11 becomes "Yes". At step SA2, the data acquiring unit 102 executes the latest control time determination processing. Specifically, at step SB1 shown in FIG. 12, the data acquiring unit 102 acquires the traffic control information from the traffic control database 140, which is shown in FIG. 17 as the "traffic control information at 15:00". At step SB2, the data acquiring unit 102 acquires the latest control time (in this case, 14:20) from the traffic control information acquired at step SB1, using the link whose traffic to be predicted (in this case, the link L1) as a key.

Referring back to FIG. 11, at step SA3, the data acquiring unit 102 executes basic data acquisition processing for acquiring the basic data (traffic information in the data collection period) from the traffic database 130.

Figure 13:
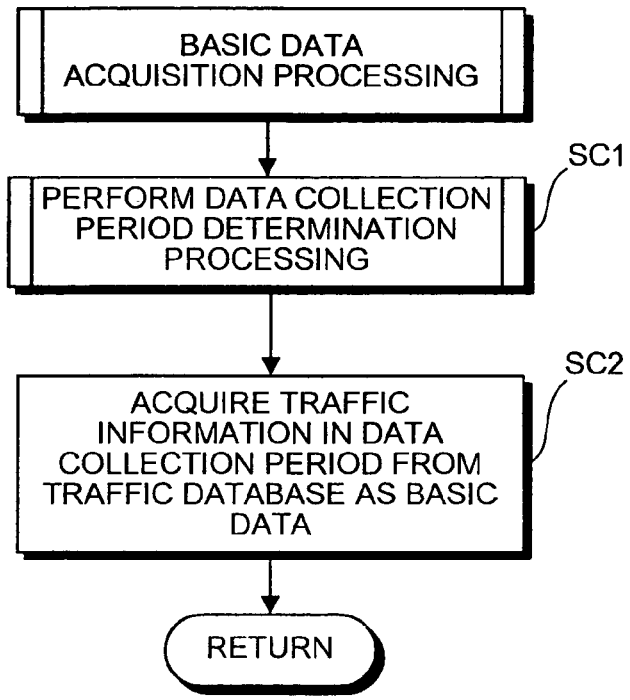
FIG. 13 is a flowchart of basic data acquisition processing shown in FIG. 11.

Specifically, at step SC1 shown in FIG. 13, the data acquiring unit 102 executes data collection period determination processing for determining the data collection period.

Figure 14:
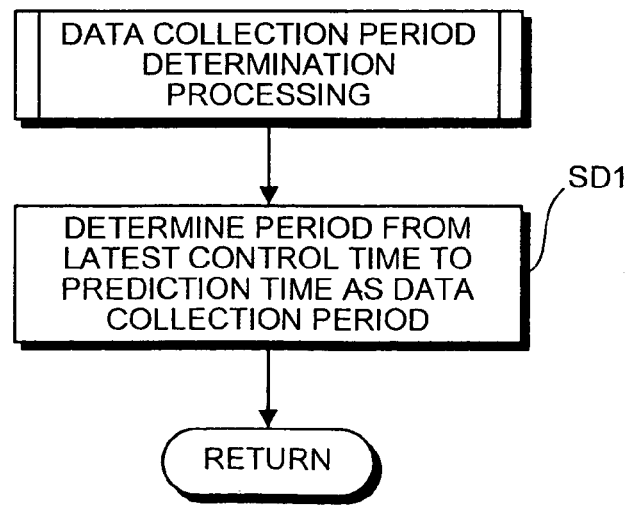
FIG. 14 is a flowchart of data collection period determination processing shown in FIG. 13.

That is, at step SD1 shown in FIG. 14, the data acquiring unit 102 determines, as shown in the graph 160 (see FIG. 17), the period from the latest control time (in this case, 14:20) determined by the latest control time determination processing (see FIG. 12) to the prediction time (in this case, 15:00) as the data collection period (see step SG2 in FIG. 17).

Referring back to FIG. 13, at step SC2, the data acquiring unit 102 acquires, as the basic data, the traffic information on the link L1 in the data collection period (14:20 to 15:00) from the traffic database 130 (see step SG2 in FIG. 17). The data acquiring unit 102 transfers the basic data to the traffic predicting unit 103.

Referring back to FIG. 11, at step SA4, the traffic predicting unit 103 executes the traffic prediction processing (see FIG. 25) based on the basic data (see step SG3 in FIG. 17).

Accordingly, as shown by broken line in the graph 161 (see FIG. 17), the predicted traffic in the link L1 from 15:00 (prediction time) to 15:30 is predicted.

Referring back to FIG. 11, at step SA5, the traffic predicting unit 103 stores the predicted traffic and time in the predicted traffic database 150 (see FIG. 1) as the predicted traffic information.

At step SA6, the control timing determining unit 104 executes control timing determination processing for determining the control timing (control time) for starting the traffic control.

Figure 15:
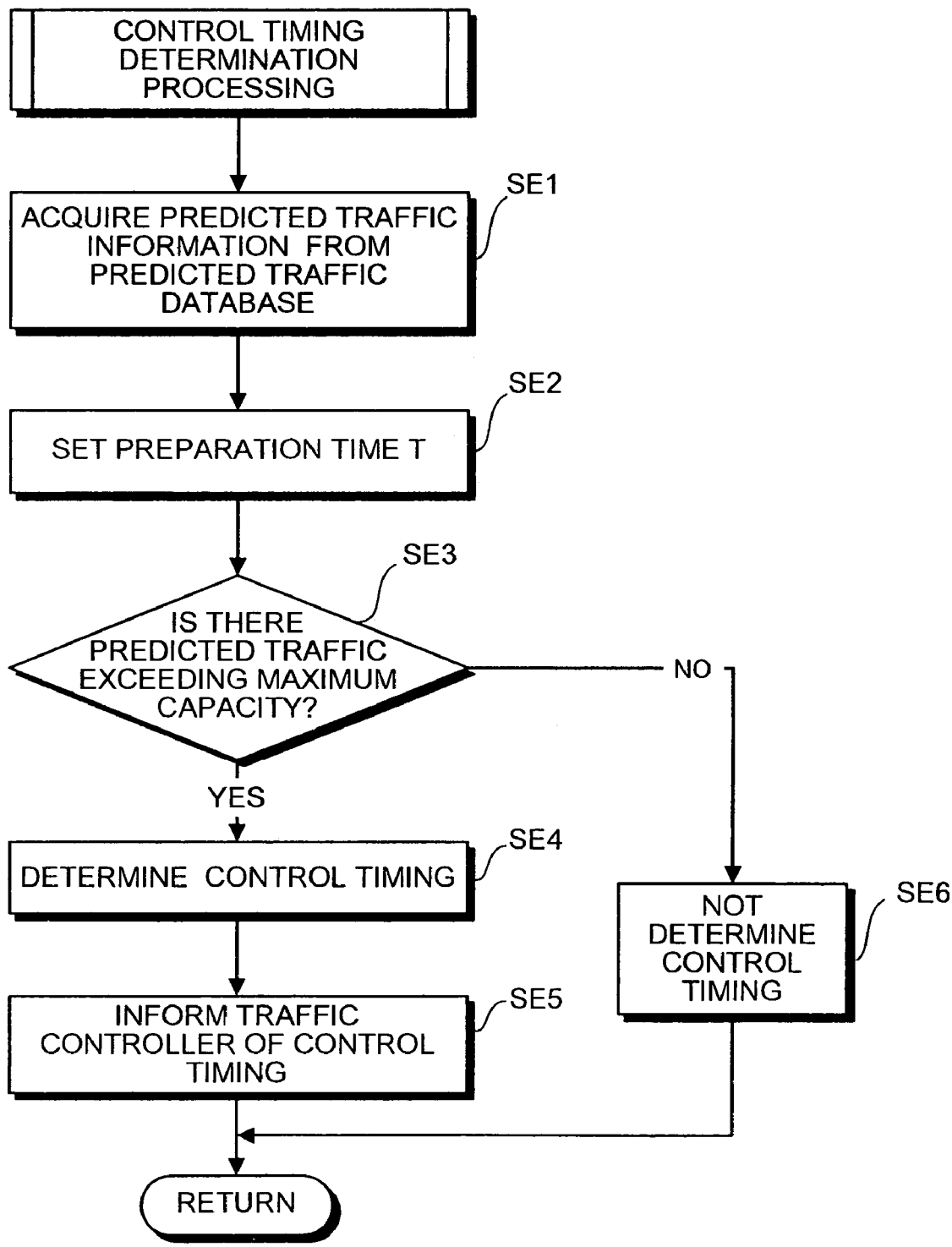
FIG. 15 is a flowchart of control timing determination processing shown in FIG. 11.
Figure 16:
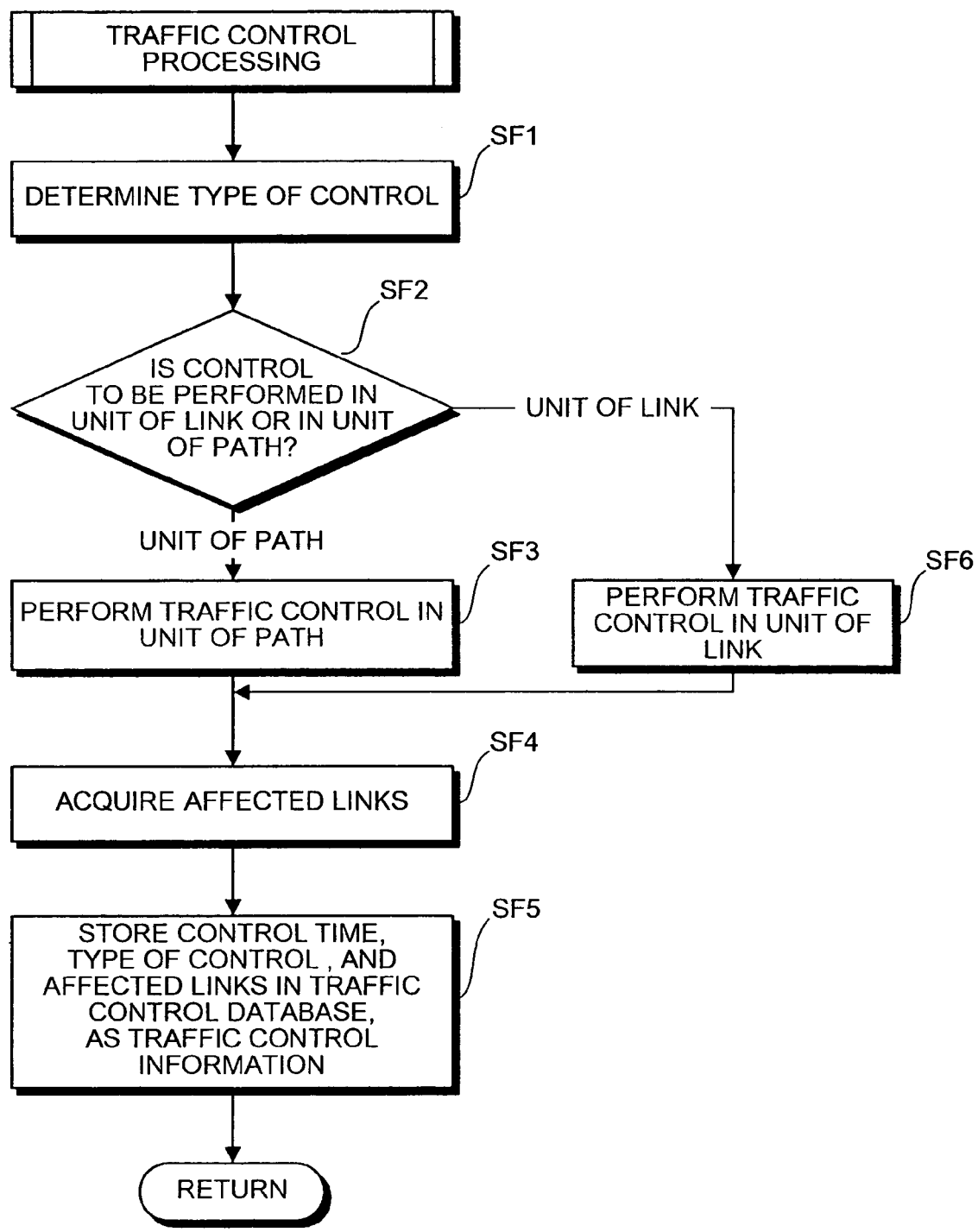
FIG. 16 is a flowchart of traffic control processing shown in FIG. 11.

Specifically, at step SE1 shown in FIG. 15, the control timing determining unit 104 acquires the predicted traffic information on the link whose traffic to be controlled (for example, link L1) predicted at step SA4 (see FIG. 11), from the predicted traffic database 150.

At step SE2, the control timing determining unit 104 sets a preparation time T (for example, 5 minutes). The preparation time T is the time from the start of the traffic control until the effect of the control is seen.

At step SE3, the control timing determining unit 104 determines whether there is predicted traffic (15:00 to 15:30) exceeding a preset maximum capacity. At 15:00, the control timing determining unit 104 determines the result at step SE3 to be "No" (see the graph 161 shown in FIG. 18).

At step SE6, the control timing determining unit 104 determines that there is no control timing (in other words, the control timing determining unit 104 does not determine the control timing). In this case, therefore, the traffic control is not executed.

Figure 5:
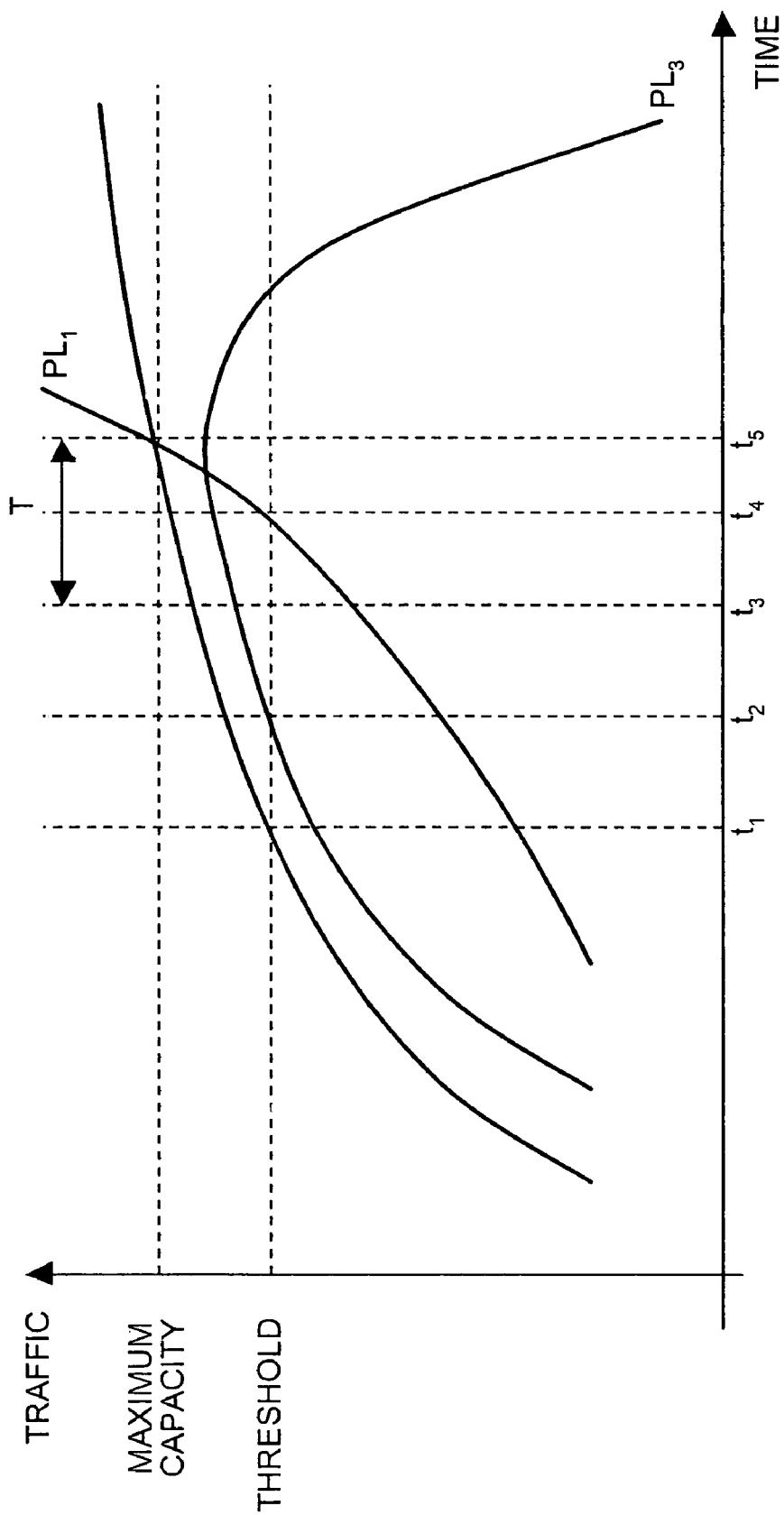
FIG. 5 is a diagram for explaining control timing determined by a control timing determining unit shown in FIG. 1.

Here, the control timing determined by the control timing determining unit 104 will be explained in detail, with reference to FIG. 5. Traffic patterns $PL_1$, $PL_2$, and $PL_3$ shown in FIG. 5 correspond to change in the predicted traffic. The traffic patterns $PL_1$ and $PL_2$ exceed the maximum capacity at time $t_5$. Accordingly, time $t_3$ earlier than time $t_5$ by the preparation time T (=5 minutes) is designated as the control timing. For the traffic pattern $PL_3$, since the traffic pattern does not exceed the maximum capacity, the control timing is not determined.

Conventionally, a threshold is set to a certain percentage of the maximum capacity, and the time when the measured traffic exceeds the threshold is set as the control timing. Conventionally, therefore, time $t_4$, $t_1$, and $t_2$ are determined as the traffic control timing with respect to the measured traffic patterns $PL_1$, $PL_2$, and $PL_3$.

Conventionally, when the traffic control is executed at time $t_4$ with respect to the traffic pattern $PL_1$, control cannot be in time since the traffic pattern $PL_1$ reaches the maximum capacity between time $t_4$ and time $t_5$, which is shorter than the preparation time T.

Conventionally, when the traffic control is executed at time $t_1$ with respect to the traffic pattern $PL_2$, control is performed too early since the traffic pattern $PL_2$ reaches the maximum capacity between time $t_1$ and time $t_5$, which exceeds the preparation time T.

Further, conventionally, when the traffic control is executed at time $t_2$ with respect to the traffic pattern $PL_3$, there is a problem in that unnecessary traffic discard is performed.

On the other hand, in the embodiment, the above problems do not occur, since the time earlier than the maximum capacity by the preparation time T is set as the control timing.

Referring back to FIG. 11, at step SA7, the traffic controller 105 determines whether the control timing has been informed from the control timing determining unit 104, and at 15:00, the determination result is "No".

At step SA1, the data acquiring unit 102 determines whether it is the prediction time (15:30, after 30 minutes since the last prediction time 15:00), and in this case, the determination result is "No", therefore the same determination is repeated.

At prediction time 15:30 in a graph 162 shown in FIG. 17, the data acquiring unit 102 determines the result at step SA1 as "Yes". At step SA2, the data acquiring unit 102 executes the latest control time determination processing. Specifically, at step SB1 shown in FIG. 12, the data acquiring unit 102 acquires the traffic control information from the traffic control database 140 shown as the "traffic control information at 15:30" in FIG. 17. At step SB2, the data acquiring unit 102 acquires the information at the latest control time (in this case, 14:20), from the traffic control information acquired at step SB1, using the link whose traffic to be predicted (in this case, link L1) as a key (see step SG4 in FIG. 17).

Referring back to FIG. 11, at step SA3, the data acquiring unit 102 executes the basic data acquisition processing for acquiring the basic data (traffic information in the data collection period) from the traffic database 130.

Specifically, at step SC1 shown in FIG. 13, the data acquiring unit 102 executes the data collection period determination processing for determining the data collection period.

That is, at step SD1 shown in FIG. 14, the data acquiring unit 102 determines, as shown in the graph 162 (see FIG. 17), the period from the latest control time (in this case, 14:20) determined in the latest control time determination processing (see FIG. 12) to the prediction time (in this case, 15:30) as the data collection period (see step SG5 in FIG. 17).

Referring back to FIG. 13, at step SC2, the data acquiring unit 102 acquires, as the basic data, the traffic information on the link L1 in the data collection period (14:20 to 15:30) from the traffic database 130 (see step SG5 in FIG. 17). The data acquiring unit 102 transfers the basic data to the traffic predicting unit 103.

Referring back to FIG. 11, at step SA4, the traffic predicting unit 103 executes the traffic prediction processing (see FIG. 25) based on the basic data (see step SG6 in FIG. 17).

Accordingly, as shown by broken line in the graph 163 (see FIG. 17), the predicted traffic in the link L1 from 15:30 (prediction time) to 16:00 is predicted.

Referring back to FIG. 11, at step SA5, the traffic predicting unit 103 stores the predicted traffic and time in the predicted traffic database 150 (see FIG. 1) as the predicted traffic information.

At step SA6, the control timing determining unit 104 executes control timing determination processing for determining the control timing (control time) for starting the traffic control.

Specifically, at step SE1 shown in FIG. 15, the control timing determining unit 104 acquires the predicted traffic information on the link whose traffic to be controlled (for example, link L1) predicted at step SA4 (see FIG. 11), from the predicted traffic database 150.

At step SE2, the control timing determining unit 104 sets the preparation time T (for example, 5 minutes). At step SE3, the control timing determining unit 104 determines whether there is predicted traffic (15:30 to 16:00) exceeding the preset maximum capacity. At 15:30, the control timing determining unit 104 determines the result at step SE3 as "Yes" since there is the predicted traffic exceeding the maximum capacity at 15:45 as shown in the graph 163 in FIG. 18.

At step SE4, the control timing determining unit 104 determines the time (in this case, 15:40) earlier than the time at which the predicted traffic exceeds the maximum capacity (in this case, 15:45) by the preparation time T (in this case, 5 minutes), as the control timing.

Figure 18:
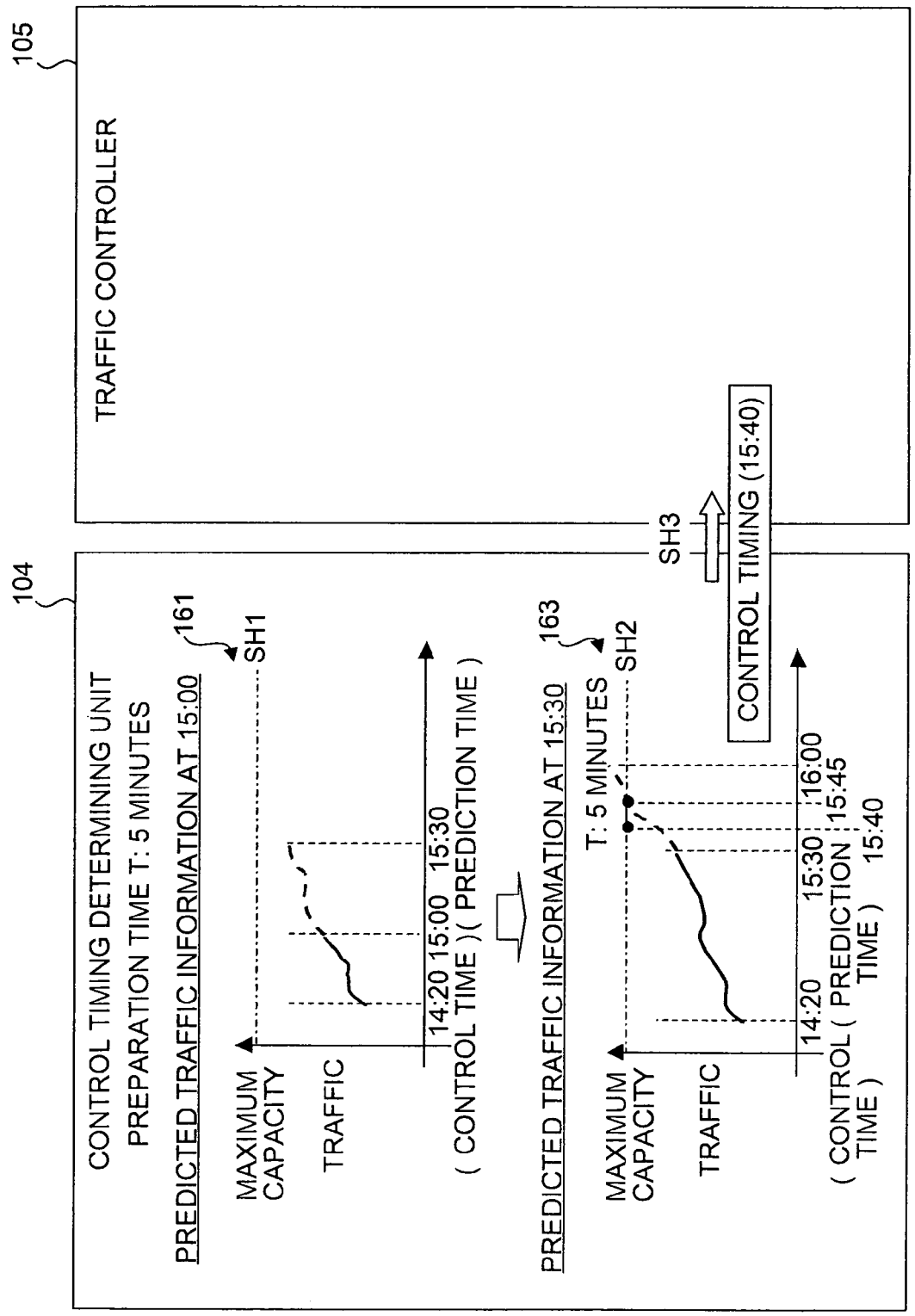
FIG. 18 is a schematic diagram for explaining the control timing determination processing shown in FIG. 15.

At step SE5, the control timing determining unit 104 informs the traffic controller 105 of the control timing (in this case, 15:40) (see step SH3 in FIG. 18). Accordingly, the traffic controller 105 determines the result at step SA7 shown in FIG. 11 as "Yes".

At step SA8, the traffic controller 105 executes the traffic control processing. Specifically, at step SF1 shown in FIG. 16, the traffic controller 105 determines the type of control based on a predetermined algorithm. In this case, the traffic controller 105 determines, as the type of control, the path route switching control for switching the path from the path P1 to the path P2 as shown in FIG. 4.

At step SF2, the traffic controller 105 determines whether the traffic control is to be performed in a unit of link or in a unit of path. In this case, since the traffic control is performed in a unit of path, the traffic controller 105 executes the processing at step SF3. At step SF3, the traffic controller 105 executes the path route switching control determined at step SF1.

Accordingly, as shown in FIG. 4, at time $t_1$ (in this case, 15:40), the path is switched from the path P1 to the path P2, the traffic in the link L1 decreases by a value S1, and the traffic in the link L3 increases by the value $S_1$. The traffic in the link L5 does not change before and after the switchover.

At step SF4, the traffic controller 105 acquires the affected link from the path/link database 120, using the path to be traffic-controlled (in this case, path P1 and path P2) as a key.

At step SF5, the traffic controller 105 stores the control time, the type of control, and the affected link in the traffic control database 140 as the traffic control information (see step SG7 in FIG. 17).

On the other hand, when the traffic control is performed in a unit of link, the traffic controller 105 executes the processing at step SF6. At step SF6, the traffic controller 105 executes the type of control determined at step SF1 in a unit of link.

At step SF4, the traffic controller 105 acquires the affected link.

At step SF5, the traffic controller 105 stores the control time, the type of control, and the affected links in the traffic control database 140 as the traffic control information (see step SG7 in FIG. 17).

Referring back to FIG. 11, at prediction time 16:00 in a graph 164 shown in FIG. 17, the data acquiring unit 102 determines the result at step SA1 as "Yes". At step SA2, the data acquiring unit 102 executes the latest control time determination processing. Specifically, at step SB1 shown in FIG. 12, the data acquiring unit 102 acquires the traffic control information from the traffic control database 140 shown as the "traffic control information at 16:00" in FIG. 17. At step SB2, the data acquiring unit 102 acquires the information at the latest control time (in this case, 15:40), from the traffic control information acquired at step SB1, using the link whose traffic to be predicted (in this case, link L1) as a key (see step SG8 in FIG. 17).

Referring back to FIG. 11, at step SA3, the data acquiring unit 102 executes the basic data acquisition processing for acquiring the basic data (traffic information in the data collection period) from the traffic database 130.

Specifically, at step SC1 shown in FIG. 13, the data acquiring unit 102 executes the data collection period determination processing for determining the data collection period.

That is, at step SD1 shown in FIG. 14, the data acquiring unit 102 determines, as shown in the graph 164 (see FIG. 17), the time from the latest control time (in this case, 15:40) determined in the latest control time determination processing (see FIG. 12) to the prediction time (in this case, 16:00) as the data collection period (see step SG9 in FIG. 17).

Referring back to FIG. 13, at step SC2, the data acquiring unit 102 acquires, as the basic data, the traffic information on the link L1 in the data collection period (15:40 to 16:00) from the traffic database 130 (see step SG9 in FIG. 17). The data acquiring unit 102 transfers the basic data to the traffic predicting unit 103.

Referring back to FIG. 11, at step SA4, the traffic predicting unit 103 executes the traffic prediction processing (see FIG. 25) based on the basic data (see step SG10 in FIG. 17).

Accordingly, as shown by broken line in the graph 165 (see FIG. 17), the predicted traffic in the link L1 from 16:00 (prediction time) to 16:30 is predicted.

Referring back to FIG. 11, at step SA5, the traffic predicting unit 103 stores the predicted traffic and time in the predicted traffic database 150 (see FIG. 1) as the predicted traffic information. Hereinafter, the above operation is repeated.

Figure 12:
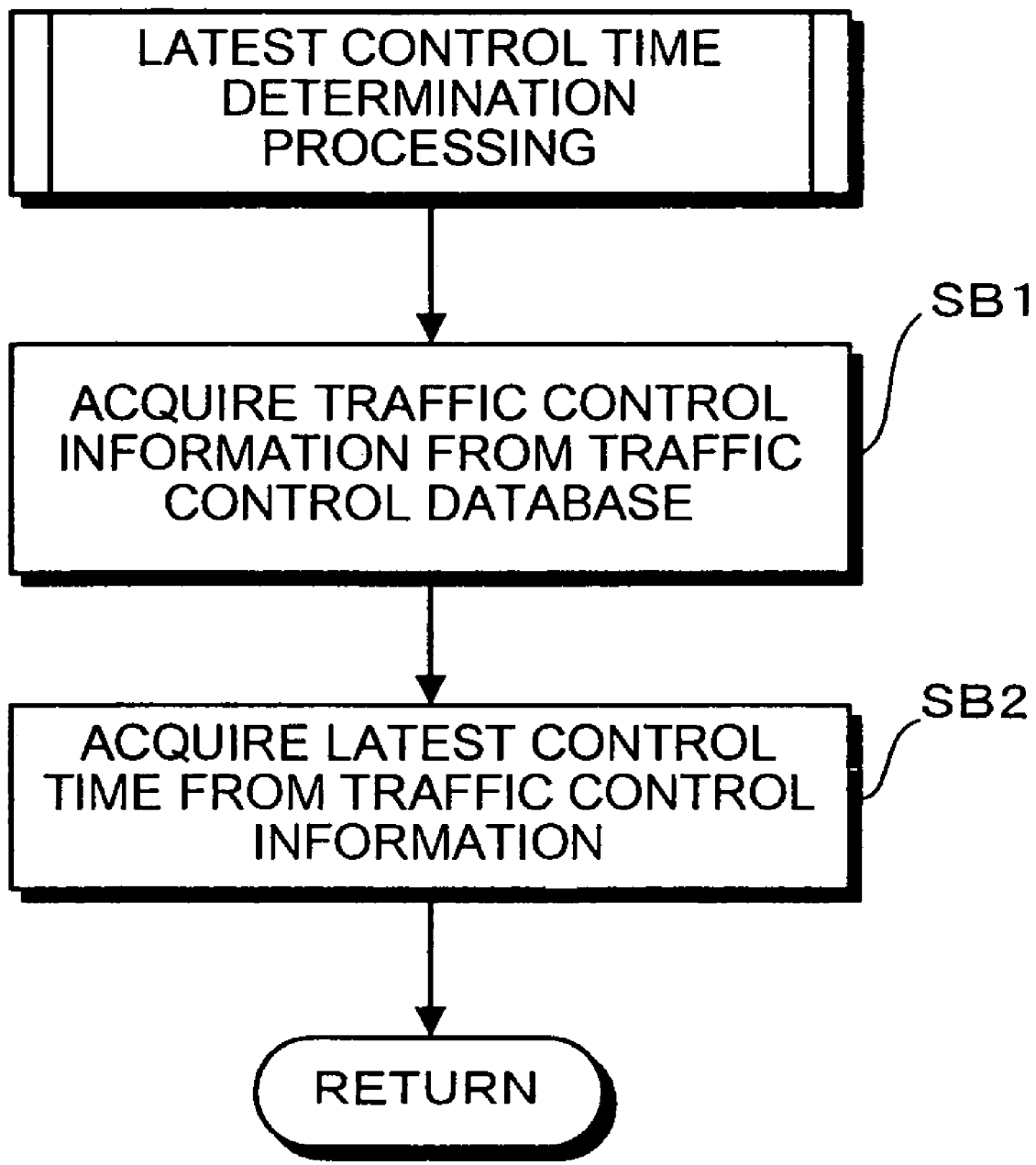
FIG. 12 is a flowchart of latest control time determination processing shown in FIG. 11.
Figure 19:
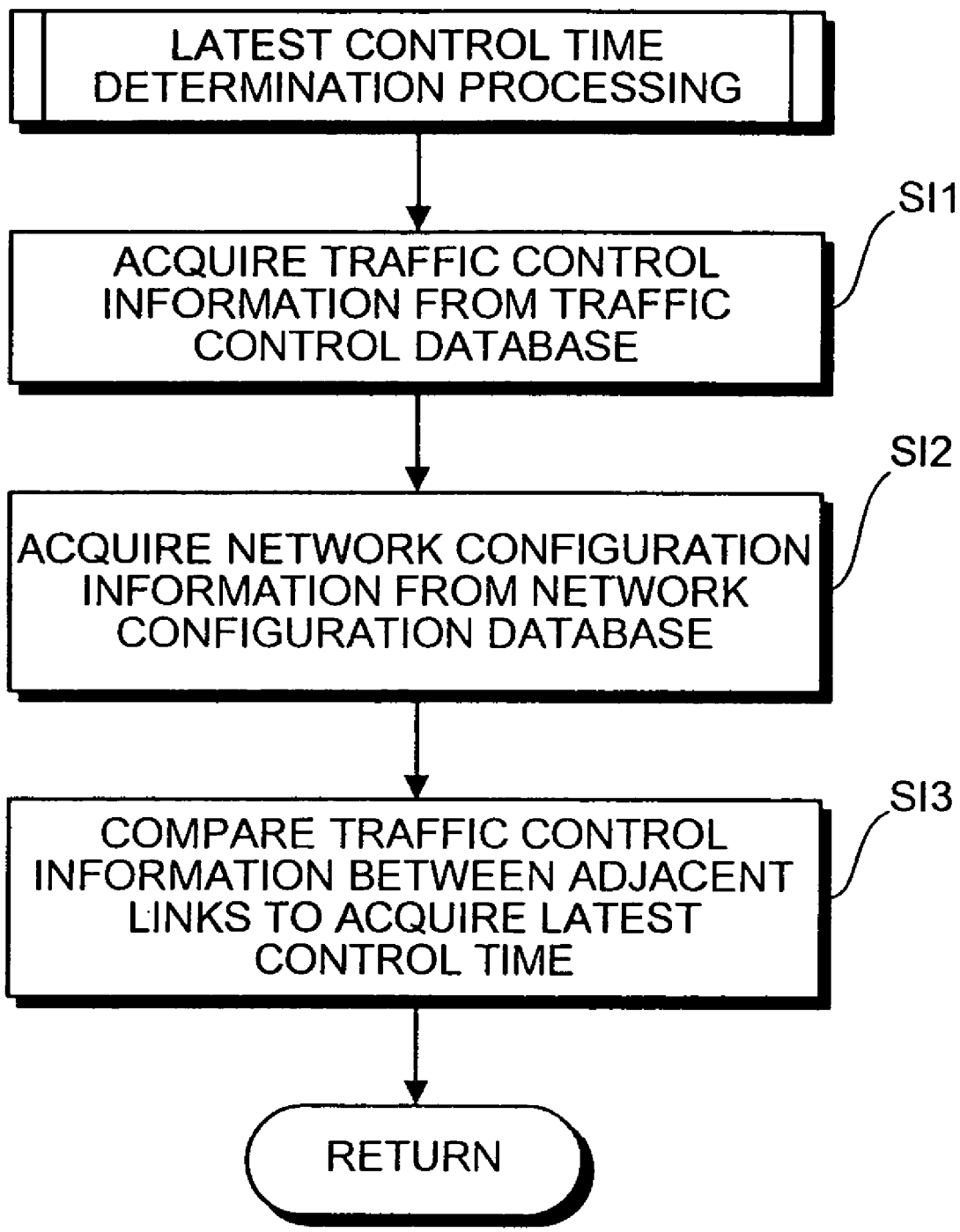
FIG. 19 is a flowchart of the latest control time determination processing according to a first example of the embodiment.

In the embodiment, as a first example, the latest control time determination processing (see FIG. 11) may be executed according to a flowchart shown in FIG. 19, instead of the flowchart shown in FIG. 12.

At step SI1 shown in FIG. 19, the data acquiring unit 102 acquires the traffic control information from the traffic control database 140 (see FIG. 10). At step SI2, the data acquiring unit 102 acquires the network configuration information corresponding to the link whose traffic to be predicted from the network configuration database 110 (see FIG. 6).

At step SI3, the data acquiring unit 102 determine the latest control time by comparing the traffic control information (control time) between the link and the adjacent links.

Figure 20:
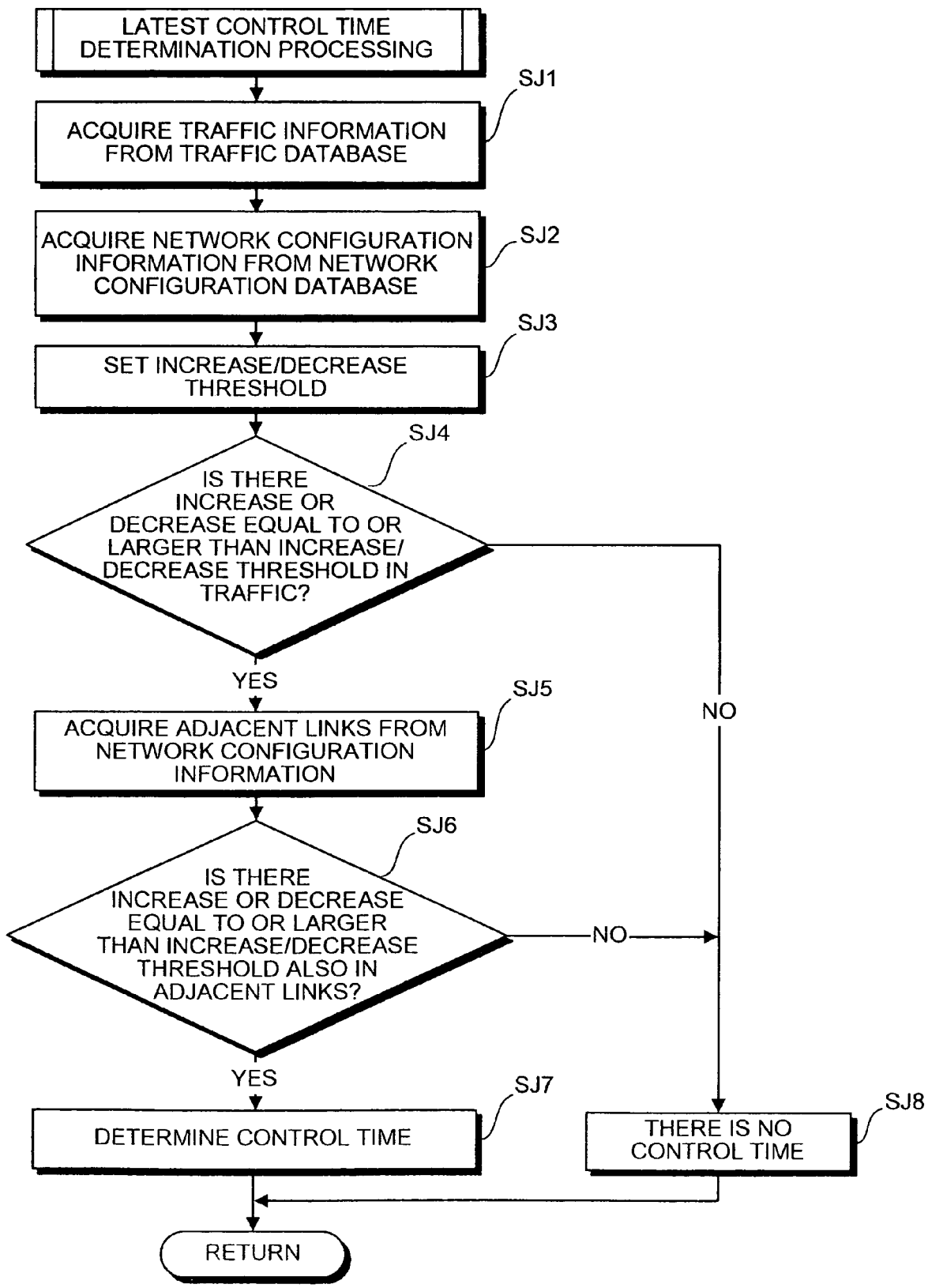
FIG. 20 is a flowchart of the latest control time determination processing according to a second example of the embodiment.

In the embodiment, as a second example, the latest control time determination processing (see FIG. 11) may be executed according to a flowchart shown in FIG. 20, instead of the flowchart shown in FIG. 12.

In the second example explained below, when there is an increase or decrease equal to or larger than an increase/decrease threshold in the traffic in adjacent two links, the increase/decrease time is determined as the control time, instead of referring to the traffic control information (control time).

At step SJ1 shown in FIG. 20, the data acquiring unit 102 acquires the traffic information from the traffic database 130. At step SJ2, the data acquiring unit 102 acquires the network configuration information from the network configuration database 110. At step SJ3, the data acquiring unit 102 sets the increase/decrease threshold (for example, 50 Mbps).

At step SJ4, the data acquiring unit 102 determines whether there is an increase or decrease equal to or larger than the increase/decrease threshold in the traffic, based on the traffic information acquired at step SJ1.

When the result of the determination at step SJ4 is "Yes", at step SJ5, the data acquiring unit 102 acquires the information of the adjacent links from the network configuration information. At step SJ6, the data acquiring unit 102 determines whether there is an increase or decrease equal to or larger than the increase/decrease threshold at the same time in the traffic of the adjacent links. When the result of the determination at step SJ6 is "Yes", at step SJ7, the data acquiring unit 102 determines the time at which there is an increase or decrease equal to or larger than the increase/decrease threshold as the control time.

On the other hand, when the result of the determination at steps SJ4 or SJ6 is "No", at step SJ8, the data acquiring unit 102 determines that there is no control time.

Figure 21:
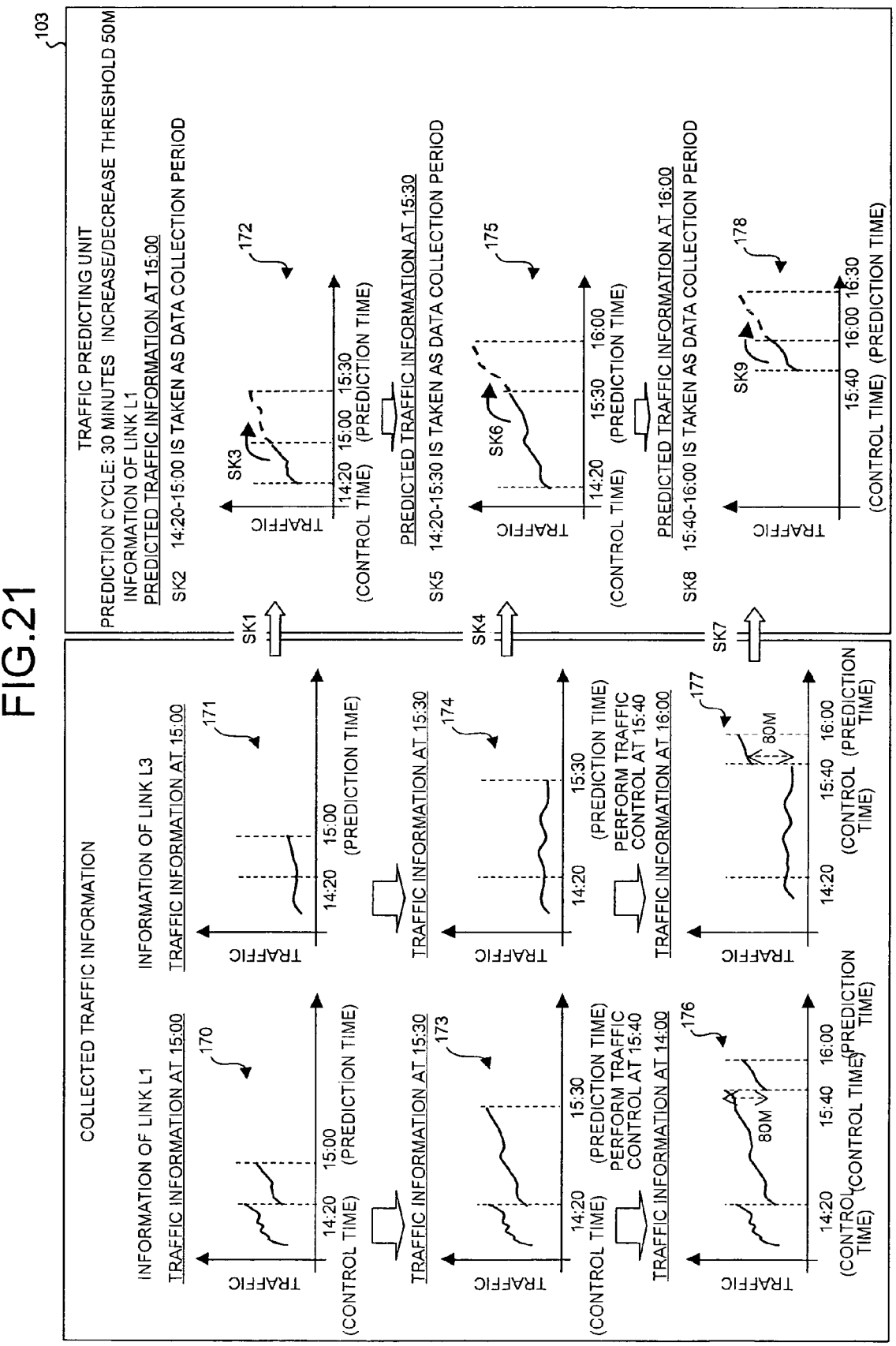
FIG. 21 is a schematic diagram for explaining the latest control time determination processing according to the second example.

FIG. 21 is an explanatory diagram of the latest control time determination processing according to the second example shown in FIG. 20. In FIG. 21, graphs 170, 173, and 176 represent changes over time in the traffic in the link L1 (see FIGS. 3 and 4), and correspond to the traffic information (actual measurement values) collected by the traffic information collecting unit 101 (see FIG. 1) and stored in the traffic database 130.

Graphs 171, 174, and 177 represent changes over time in the traffic in the link L3 (see FIGS. 3 and 4) and correspond to the traffic information (actual measurement values) collected by the traffic information collecting unit 101 (see FIG. 1) and stored in the traffic database 130.

Broken lines in respective graphs 172, 175, and 178 represent changes over time in the predicted traffic (actual measurement values) predicted by the traffic predicting unit 103 for the traffic in the link L1 (see FIGS. 3 and 4).

In FIG. 21, as shown in the graph 170, the traffic control affecting the link L1 was executed at the control time 14:20. The prediction cycle is set to be 30 minutes in the traffic predicting unit 103. The increase/decrease threshold is set at 50 Mbps in the data acquiring unit 102.

At step SK1, the data acquiring unit 102 acquires the traffic information corresponding to the graphs 170 and 171 from the traffic database 130, and also acquires the network configuration information from the network configuration database 110.

At step SK2, the data acquiring unit 102 acquires the traffic information for the time from 14:20 to 15:00 as the basic data in the same manner as described above. The data acquiring unit 102 determines whether there is an increase or decrease equal to or larger than the increase/decrease threshold in the traffic information for the time from 14:20 to 15:00 in the graph 170. At 15:00, the result of the determination is "No". At step SK3, the traffic predicting unit 103 predicts the traffic for the time from 15:00 to 15:30 shown by broken line in the graph 172 based on the basic data, in the same manner as described above.

At step SK4, the data acquiring unit 102 acquires the traffic information corresponding to the graphs 173 and 174, from the traffic database 130.

At step SK5, the data acquiring unit 102 acquires the traffic information for the time from 14:20 to 15:30 in the graph 173 as the basic data, in the same manner as described above. The data acquiring unit 102 determines whether there is an increase or decrease equal to or larger than the increase/decrease threshold in the traffic information for the time from 14:20 to 15:30. At 15:30, the result of the determination is "No". At step SK6, the traffic predicting unit 103 predicts the traffic for the time from 15:30 to 16:00 shown by broken line in the graph 175, based on the basic data, in the same manner as described above.

As shown in the graphs 176 and 177, it is assumed herein that the traffic control is executed at the control time 15:40, and there is an increase or decrease of 80 Mbps in the traffic.

At step SK7, the data acquiring unit 102 acquires the traffic information corresponding to the graphs 176 and 177 from the traffic database 130.

At step SK7, the data acquiring unit 102 determines whether there is an increase or decrease equal to or larger than the increase/decrease threshold in the traffic information for the time from 14:20 to 16:00 in the graph 176. At 16:00, the determination result is "Yes".

The data acquiring unit 102 then determines whether there is an increase or decrease equal to or larger than the increase/decrease threshold in the traffic information for the time from 14:20 to 16:00 in the graph 177 corresponding to the link L3, which is adjacent to the link L1. At 16:00, the determination result is "Yes".

Accordingly, at step SK8, the data acquiring unit 102 determines the time 15:40 corresponding to the increase or decrease as the control time.

The data acquiring unit 102 acquires the traffic information for the time from 15:40 to 16:00 as the basic data, in the same manner as described above.

At step SK9, the traffic predicting unit 103 predicts the traffic for the time from 16:00 to 16:30 shown by broken line in the graph 178 based on the basic data, in the same manner as described above.

Figure 22:
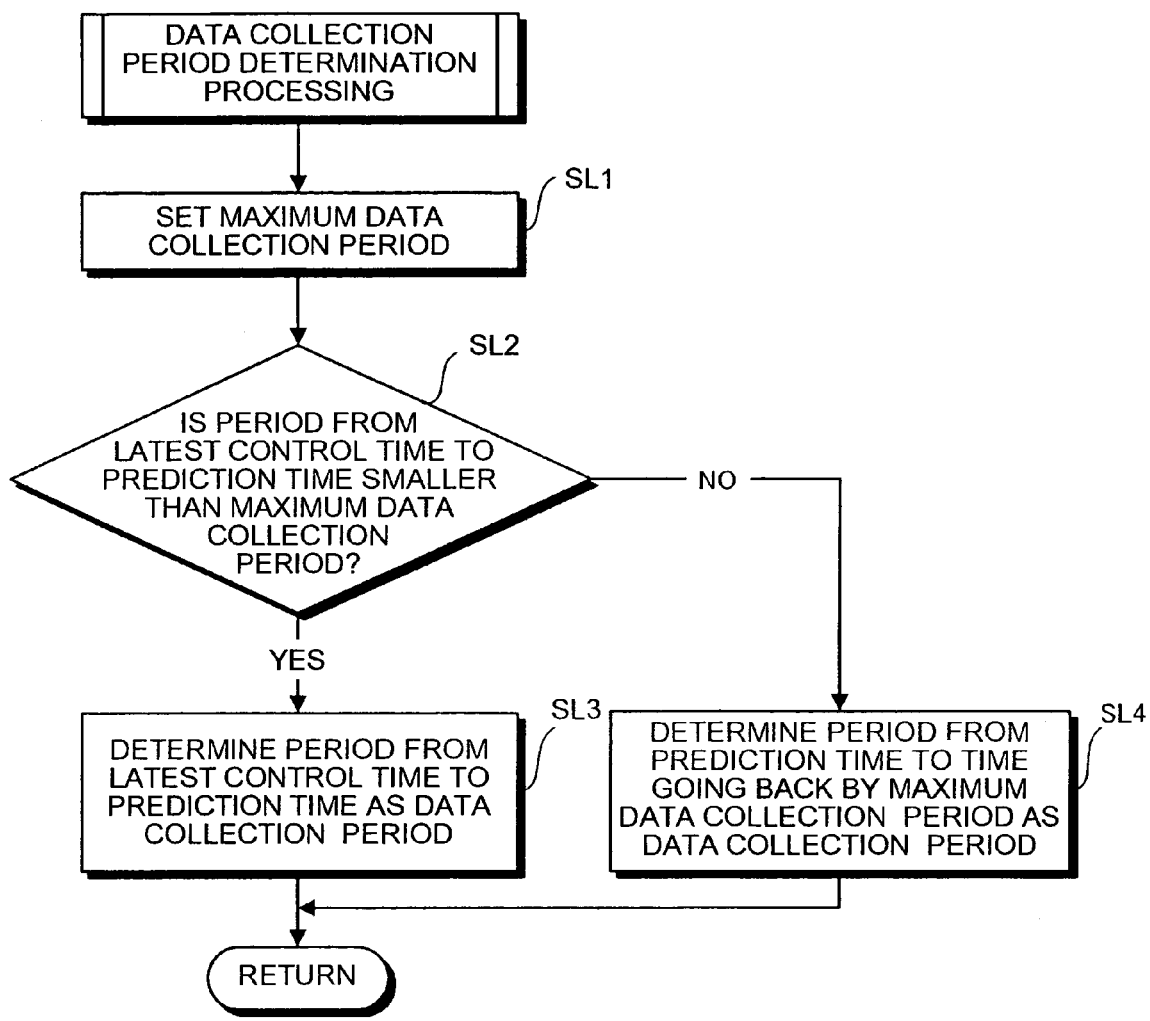
FIG. 22 is a flowchart of the data collection period determination processing according to a third example of the embodiment.
Figure 23:
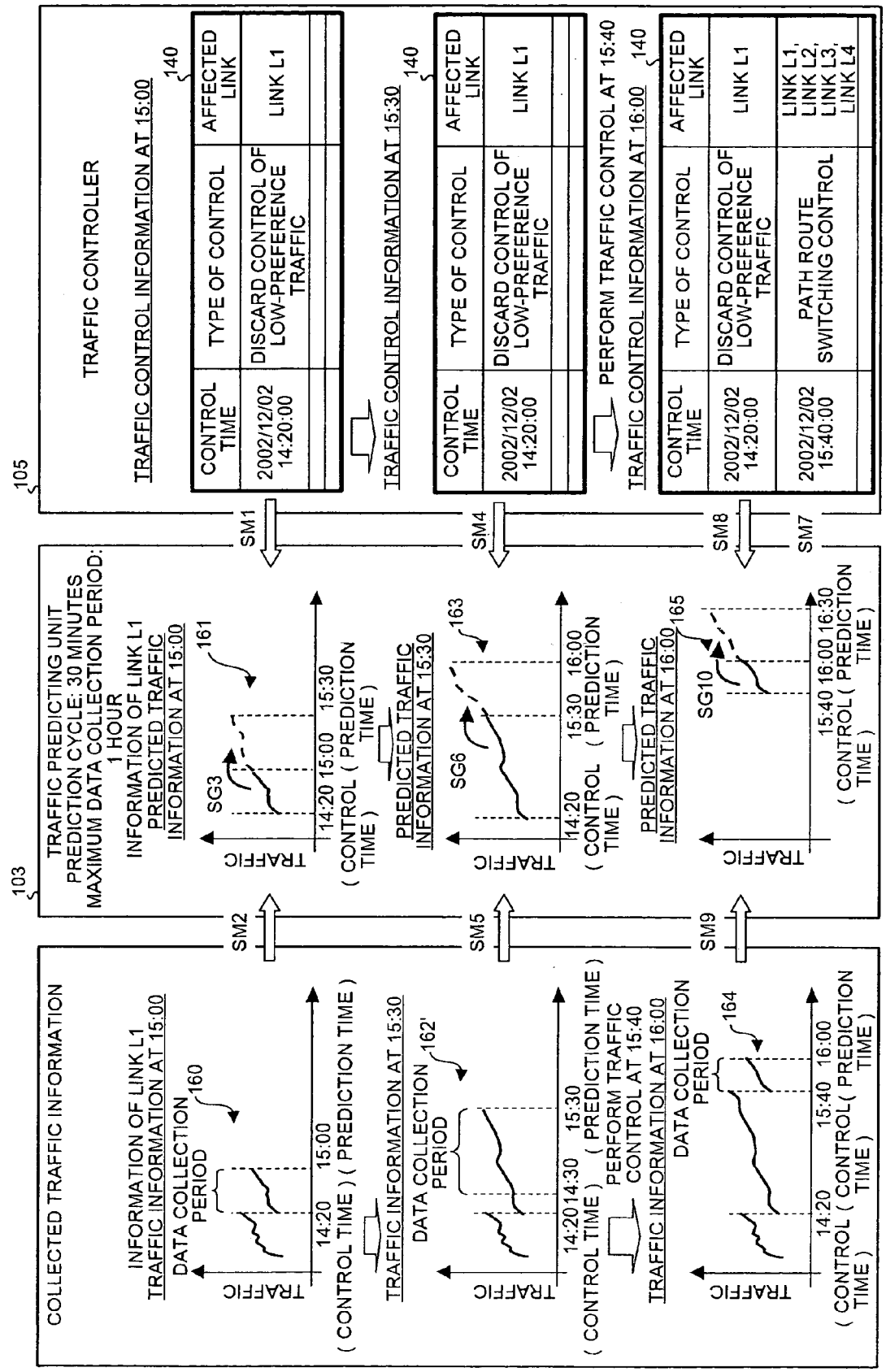
FIG. 23 is a schematic diagram for explaining the data collection period determination processing according to the third example.

In the embodiment, the data collection period determination processing (see FIG. 13) may be executed according to a flowchart shown in FIG. 22, instead of the flowchart shown in FIG. 14, as a third example. FIG. 23 is an explanatory diagram of the data collection period determination processing according to the third example shown in FIG. 22.

In FIG. 23, like reference signs as in FIG. 17 designate like parts. In FIG. 23, a graph 162' is shown instead of the graph 162 shown in FIG. 17. In FIG. 23, steps SM1 to SM9 correspond to steps SG1 to SG9 shown in FIG. 17.

In the third example explained below, the data collection period is determined in the range of the preset maximum data collection period.

At step SL1 shown in FIG. 22, the data acquiring unit 102 sets the maximum data collection period (for example, 60 minutes). At step SL2, the data acquiring unit 102 determines whether the period from the latest control time is within the maximum data collection period, based on the traffic information.

For example, as in the graph 160 shown in FIG. 23, when the period from the latest control time 14:20 to the prediction time 15:00 is 40 minutes, the data acquiring unit 102 determines the result at step SL2 as "Yes".

At step SL3, the data acquiring unit 102 determines the period (40 minutes) as the data collection period, in the same manner as at step SD1 (see FIG. 14).

On the other hand, as in the graph 162' shown in FIG. 23, when the period from the latest control time 14:20 to the prediction time 15:30 is 70 minutes, the data acquiring unit 102 determines the result at step SL2 as "No".

At step SL4, the data acquiring unit 102 determines the period (60 minutes) from the prediction time 15:30 to the time 14:30 going back by the maximum data collection period (60 minutes) in the graph 162' as the data collection period.

According to the embodiment, the traffic information for the period from the latest traffic control time to the prediction time is acquired as the basic data from the traffic information collected from the network 200, to predict the traffic after the prediction time in the network 200 based on the basic data. As a result, since the traffic information fluctuated due to the traffic control is not included in the basic data, the accuracy in predicting the traffic can be improved.

According to the embodiment, since the traffic control is performed at the control timing determined based on the traffic predicted by the traffic predicting unit 103, the control timing can be determined with high accuracy according to the traffic predicted with high accuracy.

According to the embodiment, as explained with reference to FIG. 5, since the time earlier than the time when the predicted traffic exceeds the maximum capacity by the preset preparation time is determined as the control timing, the control timing in the traffic control can be optimized.

Figure 24:
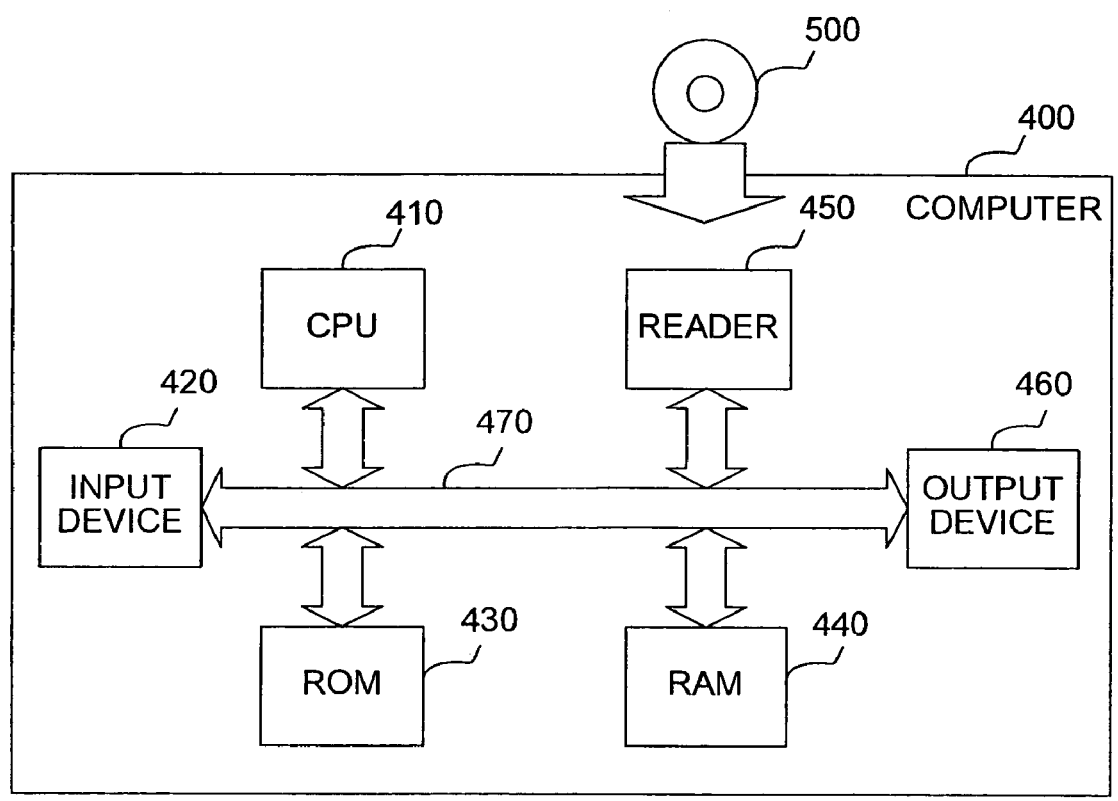
FIG. 24 is a block diagram of a network management device according to a fourth example of the embodiment.

A program for realizing the respective functions of the network management device 100 may be recorded in a computer readable recording medium 500 shown in FIG. 24, as a fourth example of the embodiment, and the program recorded in the recording medium 500 may be read and executed by a computer 400, thereby realizing the respective functions.

The computer 400 includes a central processing unit (CPU) 410 that executes the program, an input device 420 such as a keyboard and a mouse, a read only memory (ROM) 430 for storing various types of data, a random access memory (RAM) 440 for storing arithmetic parameters and the like, a reader 450 that reads the program from the recording medium 500, an output device 460 such as a display and a printer, and a bus 470 for connecting respective units of the apparatus.

The CPU 410 realizes the respective functions by reading the program stored in the recording medium 500 via the reader 450 and executing the program. The recording medium 500 includes an optical disk, a flexible disk, a hard disk, and the like.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for controlling a traffic on a network including a plurality of links, the apparatus comprising:
a collecting unit that collects information on the traffic for each of the links periodically;
an acquiring unit to acquire basic data collected from a link for a predetermined period;
a predicting unit to predict a future traffic on the link based on the basic data;
a determining unit to determine a timing of a control of the traffic based on the future traffic predicted, a start time of the predetermined period being a time when a latest control of the traffic was performed on the link or other link adjacent to the link, the determining unit determining, as the timing of the control, a time earlier by a predetermined preparation time for the control than a time when the future traffic predicted exceeds a maximum capacity of the network; and
a traffic controller to execute the control at the timing determined.

2. The apparatus according to claim 1, further comprising a storage unit that stores a log of a control of the traffic, wherein
the start time is determined based on the log.

3. The apparatus according to claim 1, further comprising a detecting unit to detect an abrupt change in a traffic on the link, wherein
when the abrupt change is detected within the predetermined period, the start time is determined based on the abrupt change.

4. The apparatus according to claim 3, wherein the detecting unit to detect the abrupt change when a change in the traffic on the link is out of a predetermined range.

5. The apparatus according to claim 1, further comprising a maximum-period setting unit to set a maximum period for the predetermined period, wherein
when the predetermined period is longer than the maximum period, the acquiring unit acquires the basic data collected from the link for the maximum period.

6. A method for controlling a traffic on a network including a plurality of links, the method comprising:
collecting information on the traffic for each of the links periodically;
acquiring basic data collected from a link for a predetermined period;
predicting a future traffic on the link based on the basic data;
determining a timing of a control of the traffic based on the future traffic predicted, a start time of the predetermined period being a time when a latest control of the traffic was performed on the link or other link adjacent to the link, the determining including determining, as the timing of the control, a time earlier by a predetermined preparation time for the control than a time when the future traffic predicted exceeds a maximum capacity of the network; and
executing the control at the timing determined.

7. The method according to claim 6, further comprising storing a log of a control of the traffic, wherein
the start time is determined based on the log.

8. The method according to claim 6 further comprising detecting an abrupt change in a traffic on the link, wherein
when the abrupt change is detected within the predetermined period, the start time is determined based on the abrupt change.

9. The method according to claim 8, wherein the detecting includes detecting the abrupt change when a change in the traffic on the link is out of a predetermined range.

10. The method according to claim 6, further comprising setting a maximum period for the predetermined period, wherein
when the predetermined period is longer than the maximum period, the acquiring includes acquiring the basic data collected from the link for the maximum period.

11. A computer-readable, non-transitory medium storing program that causes a computer to execute a procedure, the procedure comprising:
collecting information on a traffic for each of links in a network periodically;
acquiring basic data collected from a link for a predetermined period;
predicting a future traffic on the link based on the basic data;
determining a timing of a control of the traffic based on the future traffic predicted, a start time of the predetermined period being a time when a latest control of the traffic was performed on the link or other link adjacent to the link, the determining including determining, as the timing of the control, a time earlier by a predetermined preparation time for the control than a time when the future traffic predicted exceeds a maximum capacity of the network; and
executing the control at the timing determined.

12. The computer-readable recording medium according to claim 11, wherein the computer program further causes the computer to execute storing a log of a control of the traffic, wherein
the start time is determined based on the log.

13. The computer-readable recording medium according to claim 11, wherein the computer program further causes the computer to execute detecting an abrupt change in a traffic on the link, wherein
when the abrupt change is detected within the predetermined period, the start time is determined based on the abrupt change.

14. The computer-readable recording medium according to claim 11, wherein the computer program further causes the computer to execute setting a maximum period for the predetermined period, wherein
when the predetermined period is longer than the maximum period, the acquiring includes acquiring the basic data collected from the link for the maximum period.

15. The apparatus according to claim 1, wherein the control is switching paths or discarding a low-priority traffic.

16. The method according to claim 6, wherein the control is switching paths or discarding a low-priority traffic.

17. The computer-readable recording medium according to claim 11, wherein the control is switching paths or discarding a low-priority traffic.

* * * * *